US009261381B2

(12) United States Patent
Rottler et al.

(10) Patent No.: US 9,261,381 B2
(45) Date of Patent: *Feb. 16, 2016

(54) SYSTEMS AND METHODS FOR TRANSITIONING BETWEEN PEDOMETER MODES

(71) Applicant: Apple Inc., Cupertino, CA (US)

(72) Inventors: Benjamin A. Rottler, San Francisco, CA (US); Jorge S. Fino, San Jose, CA (US); Anton M. Davydov, Gilroy, CA (US); Prashanth Ramachandran, Foster City, CA (US); Allen P. Haughay, Jr., San Jose, CA (US); Policarpo B. Wood, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/294,824

(22) Filed: Jun. 3, 2014

(65) Prior Publication Data

US 2014/0278230 A1 Sep. 18, 2014

Related U.S. Application Data

(63) Continuation of application No. 12/552,413, filed on Sep. 2, 2009.

(51) Int. Cl.
*G01C 22/00* (2006.01)

(52) U.S. Cl.
CPC .................................... *G01C 22/006* (2013.01)

(58) Field of Classification Search
USPC ......................................................... 702/160
See application file for complete search history.

(56) References Cited

U.S. PATENT DOCUMENTS

| 5,471,405 A | 11/1995 | Marsh |
| 5,953,677 A | 9/1999 | Sato |
| 6,013,007 A | 1/2000 | Root et al. |
| 6,032,108 A | 2/2000 | Seiple et al. |
| 6,135,951 A | 10/2000 | Richardson et al. |

(Continued)

FOREIGN PATENT DOCUMENTS

| JP | 2000-227341 | 8/2000 |
| WO | 02/093272 | 11/2002 |

OTHER PUBLICATIONS

PCT/JP2008/002536, 2 pages (complete PCT file in US case 12808543).*

(Continued)

*Primary Examiner* — Tung S Lau
(74) *Attorney, Agent, or Firm* — Van Court & Aldridge LLP

(57) ABSTRACT

Systems and methods are provided that allow steps to be counted in multiple pedometer modes. For example, a pedometer application on an electronic device can count steps in an ambient mode of operation and a session mode of operation. By maintaining separate counters for each pedometer mode and continuously monitoring the desired mode of operation, the pedometer application can accurately count the number of steps during a certain time period. In response to detecting a change in the desired mode, the pedometer application can seamlessly switch to the corresponding mode counter. In some embodiments, the pedometer application can display graphical representations of historical step information for one or more pedometer modes.

20 Claims, 12 Drawing Sheets

(56) References Cited

U.S. PATENT DOCUMENTS

| | | |
|---|---|---|
| 6,145,389 A | 11/2000 | Ebeling et al. |
| 6,357,147 B1 | 3/2002 | Darley et al. |
| 6,463,385 B1 | 10/2002 | Fry |
| 6,539,336 B1 | 3/2003 | Vock et al. |
| 6,560,903 B1 | 5/2003 | Darley |
| 6,582,342 B2 | 6/2003 | Kaufman |
| 6,619,835 B2 | 9/2003 | Kita |
| 6,716,139 B1 | 4/2004 | Hosseinzadeh-Dolkhani et al. |
| 6,790,178 B1 | 9/2004 | Mault et al. |
| 6,793,607 B2 | 9/2004 | Neil |
| 6,898,550 B1 | 5/2005 | Blackadar et al. |
| 7,030,735 B2 | 4/2006 | Chen |
| 7,062,225 B2 | 6/2006 | White |
| 7,145,454 B2 | 12/2006 | Linjama et al. |
| 7,171,331 B2 | 1/2007 | Vock et al. |
| 7,174,227 B2 | 2/2007 | Kobayashi et al. |
| 7,200,517 B2 | 4/2007 | Darley et al. |
| 7,251,454 B2 | 7/2007 | White |
| 7,278,966 B2 | 10/2007 | Hjelt et al. |
| 7,292,867 B2 | 11/2007 | Werner et al. |
| 7,408,506 B2 | 8/2008 | Miller |
| 7,454,002 B1 | 11/2008 | Gardner et al. |
| 7,463,997 B2 | 12/2008 | Pasolini et al. |
| 7,519,327 B2 | 4/2009 | White |
| 7,618,345 B2 | 11/2009 | Corbalis et al. |
| 7,670,263 B2 | 3/2010 | Ellis et al. |
| 2002/0077784 A1 | 6/2002 | Vock et al. |
| 2003/0097878 A1 | 5/2003 | Farringdon et al. |
| 2004/0181703 A1 | 9/2004 | Lilja et al. |
| 2005/0172311 A1 | 8/2005 | Hjelt et al. |
| 2006/0080551 A1 | 4/2006 | Mantyjarvi et al. |
| 2008/0175443 A1 | 7/2008 | Kahn et al. |
| 2008/0218310 A1 | 9/2008 | Alten et al. |
| 2009/0005975 A1 | 1/2009 | Forstall et al. |
| 2011/0131005 A1* | 6/2011 | Ueshima et al. ............. 702/141 |

OTHER PUBLICATIONS http://www.merriam-webster.com/dictionary/step, printed Mar. 5, 2014, 4 pages.

Step—Definition and More from the Free Merriam-Webster Dictionary, p. 3, May 14, 2012.

* cited by examiner

SYSTEMS AND METHODS FOR TRANSITIONING BETWEEN PEDOMETER MODES

This application is a continuation of U.S. patent application Ser. No. 12/552,413, filed Sep. 2, 2009. The content of this earlier application is incorporated by reference herein in its entirety.

FIELD OF THE INVENTION

This can relate to systems and methods for switching between multiple pedometer modes.

BACKGROUND OF THE DISCLOSURE

Pedometers are devices capable of tracking a user's steps. When a user carries a pedometer while walking, the user can monitor on the pedometer the number of steps he has walked thus far. Some pedometers are low power devices that can automatically count all of the steps that a user has walked over a fixed period of time (e.g., during a 24-hour period). Other pedometers can begin to count a user's steps only after the user has indicated that he would like his steps to be tracked.

Users of current pedometers, however, are limited to choosing between a pedometer operating in an automatic counting mode and a pedometer operating in a manual mode where a manual indication for step counting is required. Users may also desire a pedometer that can seamlessly switch between multiple step counting modes. For example, a user may want the pedometer to seamlessly switch from an automatic counting mode to a manual counting mode and finally back to the automatic counting mode.

SUMMARY OF THE DISCLOSURE

Accordingly, systems and methods are provided for seamlessly switching between multiple pedometer modes.

An electronic device can include a pedometer application that can start counting steps in a first mode. For example, the pedometer application can count steps in an ambient mode for which all of a user's steps can be automatically counted during an ambient period. For instance, the pedometer application can count all of the user's steps during a 24-hour period. Moreover, the counting can automatically restart at the end of each 24-hour period. In response to receiving a first input to start a second mode, the pedometer application can switch to counting steps in the second mode. For example, in response to receiving one or more user inputs, the pedometer application can switch to counting steps in a session mode, for which the user's steps can be counted for a specific session. The counting of steps may be in response to a user input. The user may, for example, press a button on an electronic device (e.g., the electronic device can include the pedometer), select a virtual button on a touch screen of the electronic device, rotate a click wheel on the electronic device, shake the electronic device, or any combination thereof. Then, in response to receiving a second input to end the second mode (e.g., a session mode), the pedometer application can switch back to counting steps in the first mode (e.g., an ambient mode).

The pedometer application can also provide historical step information by displaying a calendar to the user. The historical step information can include step information obtained in multiple pedometer modes. In some embodiments, the calendar can include indicators for time periods in which step information were obtained in a session mode of operation.

For a given time period, the pedometer application can determine multiple modes of operation. In some embodiments, the pedometer application can combine step information for the multiple modes of operation. For example, the pedometer application can display the total steps counted for both the ambient mode and the session mode for a given time period. In some embodiments, the pedometer application can allow the user to choose whether to combine step information for multiple modes of operation.

In response to a user input, for example, the pedometer application can display a graphical representation of the counted steps for a given time period. In some embodiments, the graphical representation can be a bar graph. The pedometer application can, for example, determine a time increment for the graph based on the frequencies used to store the counted steps. The pedometer application can also determine a start time for the graph based on, for example, the start time of the ambient mode. The pedometer application can display the graphical representation based on both the determined time increment and the determined start time. In some embodiments, the graphical representation of the counted steps can change depending on the mode of operation.

The graphical representation can also be interactive. For example, the user may select an input to either increase or decrease the time increment of the graphical representation. The user may also select an input to view counted steps for consecutive time periods.

The pedometer application can store historical step information for multiple modes of operation. In some embodiments, the duration of historical step information can be specified by the user. In response to the user selecting a longer duration, the pedometer application can download missing historical step information from a server. In response to the user selecting a shorter duration, the pedometer application can upload historical step information to the server.

BRIEF DESCRIPTION OF THE DRAWINGS

The above and other aspects and advantages of the invention will be apparent upon consideration of the following detailed description, taken in conjunction with accompanying drawings, in which like reference characters refer to like parts throughout, and in which.

DETAILED DESCRIPTION OF THE DISCLOSURE

Systems, methods, and machine-readable media (e.g., computer-readable media) are disclosed for switching between multiple pedometer modes.

Figure 1:
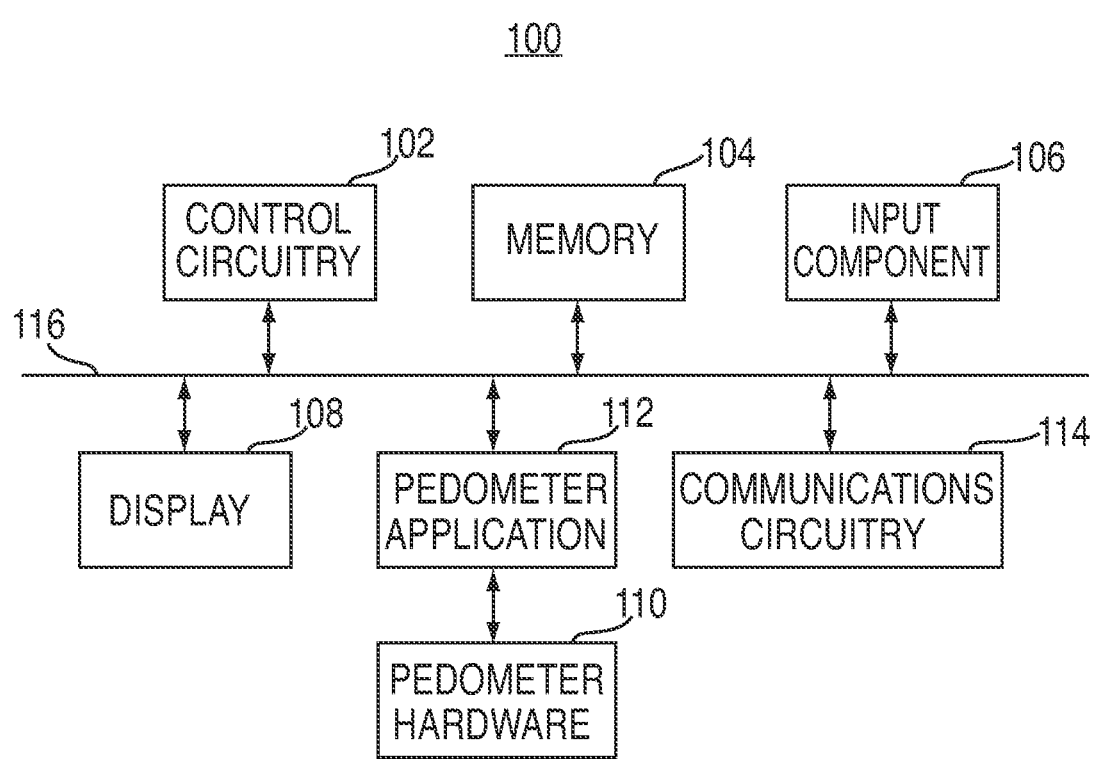
FIG. 1 shows a block diagram of an electronic device configured in accordance with various embodiments of the invention.

FIG. 1 is a schematic view of an illustrative electronic device 100 configured in accordance with various embodiments of the invention. Electronic device 100 can be any portable electronic device capable of tracking a user's steps. For example, electronic device 100 can include a portable media player (e.g., an iPod™, made available by Apple Inc. of Cupertino, Calif.), a cellular telephone (e.g., an iPhone™, made available by Apple Inc. of Cupertino, Calif.), a pocket-sized personal computer, a personal digital assistant (PDA), or any combination thereof. Electronic device 100 can include control circuitry 102, memory 104, input component 106, display 108, pedometer hardware 110, pedometer application 112, communications circuitry 114, and bus 116.

Persons skilled in the art will appreciate that while only one of each component is illustrated, electronic device 100 can include more than one of some or all of the components. Moreover, electronic device 100 can include other components not shown in FIG. 1. For example, electronic device 100 can include a power supply for providing power to the components of electronic device 100.

Control circuitry 102 can control the operation and various functions of electronic device 100. For example, as described in greater detail below, control circuitry 102 can direct display 108 to present a graphical representation of steps that have been counted by pedometer hardware 110 and pedometer application 112. Control circuitry 102 can include any components, circuitry, or logic operative to drive the functionality of electronic device 100. For example, control circuitry 102 can include one or more processors acting under the control of an application (e.g., pedometer application 112) and an operating system.

Memory 104 can include any suitable combination of non-volatile and volatile memories, such as cache memory, Flash memory, random access memory (RAM) (e.g., DDR RAM and/or SRAM), read only memory (ROM), a hard drive, an EPROM, EEPROM, or any combination thereof. In some embodiments, memory 104 can include a memory module specifically dedicated to storing firmware for control circuitry 102, such as for device applications (e.g., pedometer application 112, operating system, user interface functions, and other processor functions).

In some embodiments, memory 104 may include memory modules operative to provide mass storage for electronic device 100. For example, memory 104 can be used by control circuitry 102 to store media files (e.g., audio or video files) or other types of electronic data (e.g., text-based files, pictures, graphics, and an address book of contacts). As another example, memory 104 can be used by pedometer application 112 to store step information that has been obtained by the application. Memory 104 can, for instance, store a history of the number of steps that have been counted over a range of different time periods (e.g., daily, weekly, monthly, and/or annually). As yet another example, memory 104 can store information or metadata associated with locally stored and remotely stored elements. Memory 104 can also store any other suitable information, such as preference information (e.g., music playback preferences), lifestyle information, transaction information (e.g., credit card information), subscription information (e.g., for podcasts or television shows), and telephone information (e.g., an address book).

Input component 106, display 108, and pedometer hardware 110 can provide a user interface for a user to interact with electronic device 100. Input component 106 may enable a user to provide inputs and feedback to electronic device 100. Input component 106 can take any of a variety of forms, such as one or more of a button, keypad (e.g., computer keyboard), dial, click wheel, touch screen, or accelerometer.

Display 108 can present visual media (e.g., graphics such as graphs, album cover, text and video) to the user. Display 108 can include, for example, a liquid crystal display (LCD), a touchscreen display, or any other type of display. Electronic device 100 can also include any other suitable type of output component in addition to or instead of display 108, such as, for example, audio outputs and/or haptic outputs (e.g., vibrational outputs).

Pedometer hardware 110 can detect steps taken by a user. Pedometer hardware 110 can include any suitable type of sensors such as, for example, mechanical sensors, electrical sensors, microelectromechanical ("MEMS") sensors, or any combination thereof. In some embodiments, pedometer hardware 110 can be a mechanical sensor for detecting the motion of a user's hips or feet. In other embodiments, pedometer hardware 110 can be a MEMS sensor for detecting the magnitude and direction of acceleration along one or more axes.

Output data generated by pedometer hardware 110 can be sent to pedometer application 112. Pedometer application 112 can be any suitable software and/or hardware application for analyzing steps detected by pedometer hardware 110. In some embodiments, in addition to receiving output data from pedometer hardware 110, pedometer application 112 can also receive data from input component 106. For example, pedometer application 112 can receive inputs from a button, keypad, dial, click wheel, touch screen and/or microphone indicating a user's preference for a particular mode of operation of pedometer application 112. As another example, pedometer application 112 can receive inputs from motion sensors (e.g., one or more accelerometers for detecting motion on electronic device 100). Pedometer application 112 will be described in greater detail in connection with FIG. 2

Electronic device 100 can include communications circuitry 114 for communicating with other devices (e.g., a server). Communications circuitry 114 can, for example, be used to download historical step information from a server to electronic device 100. As another example, communications circuitry 114 can be used to upload historical step information locally stored on electronic device 100 to a server (e.g., the historical step information can thus be deleted from electronic device 100). Step information can include the number of steps counted and any other suitable information associated with the counted steps (e.g., the number of calories burned, the number of miles walked, and the time period during which the steps were counted). As described in greater detail below, the step information can be uploaded to the server in response to one or more determinations. Communications circuitry 114 can include Wi-Fi enabling circuitry that permits wireless communications according to one of the 802.11 standards or a private network. Other wired or wireless protocol standards, such as Bluetooth™, can be used in addition or instead.

Bus 116 may provide a data transfer path for transferring data to, from, or between control circuitry 102, memory 104, input component 106, display 108, pedometer hardware 110, pedometer application 112, communications circuitry 114, and some or all of the other components of electronic device 100.

Pedometer application 112 can operate in multiple step counting modes. Depending on the type of mode that pedometer application 112 is operating in, the steps detected by pedometer hardware 110 can be handled differently by pedometer application 112.

Figure 2:
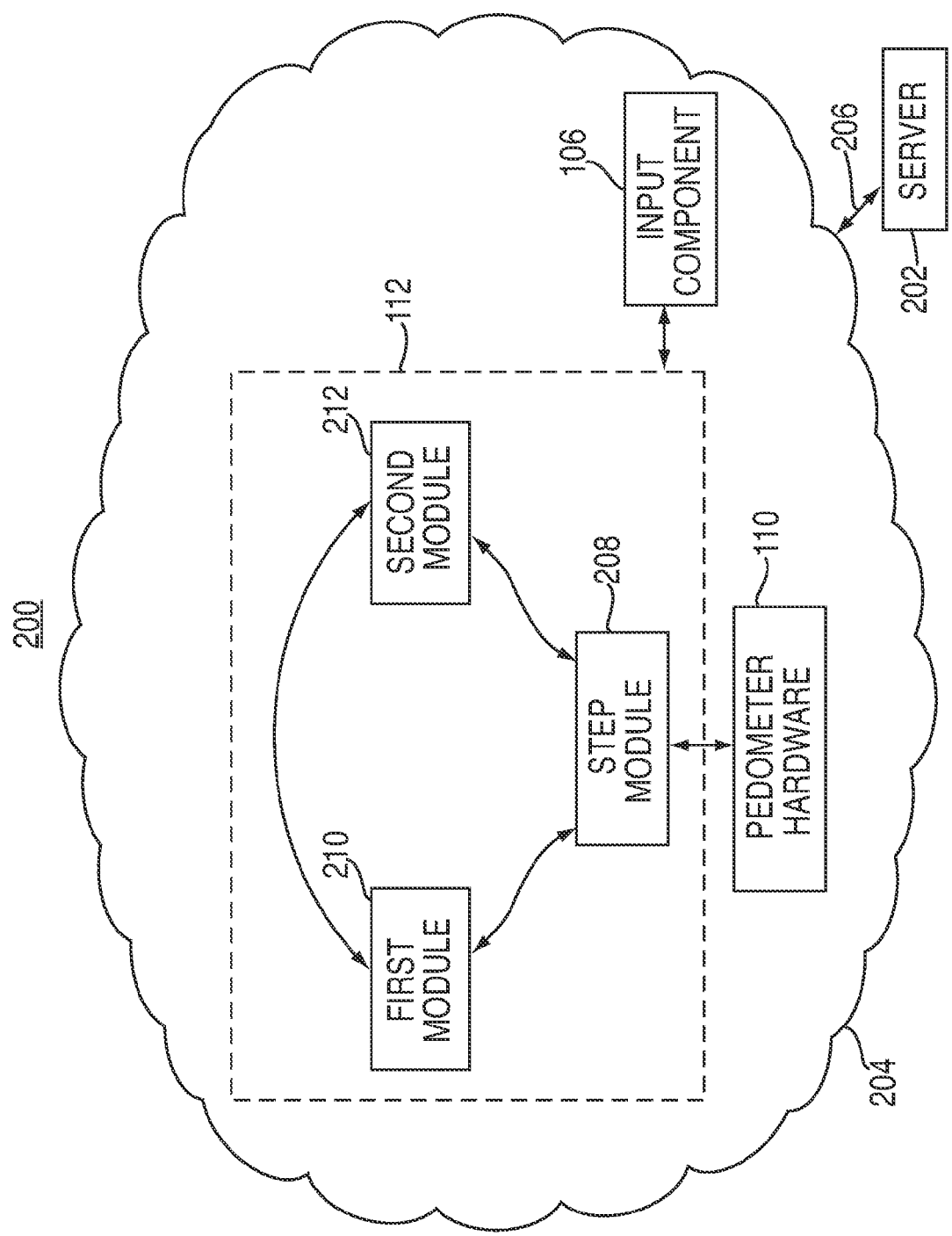
FIG. 2 shows a schematic view of a client-server data system configured in accordance with various embodiments of the invention.

FIG. 2 is a block diagram of illustrative client-server data system 200 configured in accordance with various embodiments of the invention. Data system 200 can include server 202 and client device 204. Client device 204 can be a device that is the same as or similar to electronic device 100 (FIG. 1). In some embodiments, data system 200 can include multiple servers 202, multiple client devices 204, or both multiple servers 202 and multiple client devices 204. To prevent overcomplicating the drawing, only one server 202 and one client device 204 are illustrated.

Server 202 can include any suitable type of server that can store and provide data to client device 204 (e.g., file server, database server, web server, or media server). Server 202 can store media and other data (e.g., metadata associated with the media), and server 202 can receive requests from client device 204 to obtain data. For example, server 202 can receive requests to obtain historical step information. The requests may include requests to download historical step information for a certain time interval. Responsive to the requests, server 202 can locate and provide the requested historical step information. In some embodiments, server 202 can obtain and process data from one or more client devices 204.

Server 202 can communicate with client device 204 over communications link 206. Communications link 206 can include any suitable wired or wireless communications link, or combinations thereof, by which data may be exchanged between server 202 and client device 204. For example, communications link 206 can include a satellite link, a fiber-optic link, a cable link, an Internet link, or any other suitable wired or wireless link. Communications link 206 may enable data transmission using any suitable communications protocol supported by the medium of communications link 206. Such communications protocols may include, for example, Wi-Fi (e.g., a 802.11 protocol), Ethernet, Bluetooth™, radio frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof.

Client device 204 can include any electronic device capable of counting the steps walked by a user. Client device 204 may be operative to communicate with server 202. For example, client device 204 can be any device capable of communicating via wires or wirelessly (with or without the aid of a wireless enabling accessory device). Persons skilled in the art will appreciate that client device 204 can include additional components not shown in FIG. 2.

Client device 204 can include input component 106 (FIG. 1), pedometer hardware 110 (FIG. 1), and pedometer application 112 (FIG. 1). Pedometer application 112 can operate in one or more modes. In some embodiments, pedometer application 112 can operate in an ambient mode for which all of a user's steps can be automatically counted during an ambient period. For instance, the pedometer application can count all of the user's steps during a 24-hour period. Moreover, the counting can automatically restart at the end of each 24-hour period.

The start time and/or duration of the time period can be defined in any suitable manner. For example, pedometer application 112 can default to a 24-hour period starting at 12 am each day. As another example, pedometer application 112 can allow the user to select a different starting time and/or duration for the time period. User options for configuring the ambient mode will be further described with respect to FIG. 9, for example.

In some embodiments, pedometer application 112 can operate in a session mode for which a user's steps can be counted for a specific session (e.g., within a user-specified duration). Pedometer application 112 can start to count a user's steps in the session mode only after the application has received a first input from input component 106. The first input can include an indication from the user that he would like his steps to be counted in a session mode. For example, the user may press a button on client device 204, select a virtual button on a touch screen of client device 204, rotate a click wheel on client device 204, shake client device 204, use any other suitable inputs, or any combination thereof. For instance, in response to the user shaking client device 204 in a specific pattern (e.g., two shakes), one or more accelerometers on client device 204 can detect the shaking, and the detected output can be sent to pedometer application 112.

In addition, pedometer application 112 can stop counting a user's steps in the session mode after a suitable condition has been satisfied. In some embodiments, pedometer application 112 can stop counting a user's steps in a session mode in response to receiving a second input from input component 106. For example, the user may press a button on client device 204, select a virtual button on a touch screen of client device 204, rotate a click wheel on client device 204, shake client device 204, use any other suitable inputs, or any combination thereof.

In some embodiments, in order to conserve power, pedometer application 112 can automatically stop counting steps in the session mode after a period of time has elapsed since receiving the instruction to enter the session mode. In other embodiments, pedometer application 112 can automatically stop counting steps in the session mode upon detecting that client device 204 is operating below a pre-defined power threshold. Pedometer application 112 may detect that client device 204 is operating below the pre-defined power threshold in any suitable manner, such as, for example, detecting that a battery of the device is operating at a particular energy level (e.g., less than 100 of its full energy level), receiving a signal that the battery is low, monitoring current device usage (e.g., monitoring the number of applications currently activated on the device), and/or any combination thereof. In response to detecting that client device 204 is operating below the pre-defined power threshold, pedometer application 112 can end the session mode. Persons skilled in the art will appreciate that pedometer application 112 can also stop counting steps in the ambient mode upon detecting that client device 204 is operating below the pre-defined power threshold.

In some embodiments, pedometer application 112 can operate in a default first mode (e.g., an ambient mode) unless an input is received. In response to receiving the input, pedometer application 112 can switch to a second mode (e.g., a session mode). After the second mode has ended (e.g., due to receiving a second input or due to a specific condition being met), pedometer application 112 can switch back to the first mode.

Pedometer application 112 can include step module 208, first module 210, and second module 212. In some embodiments, first module 210 can be an ambient module for counting steps in the ambient mode, and second module 212 can be a session module for counting steps in the session mode. For example, first module 210 and second module 212 can maintain separate counters for counting the number of steps detected in either the ambient mode or the session mode. Thus, if the current mode of operation is the ambient mode, first module 210 can increment its ambient counter by one in response to receiving a detected step from step module 208. On the other hand, if the current mode of operation is the session mode, second module 212 can increment its session counter by one in response to receiving a detected step from step module 208.

Persons skilled in the art will appreciate that first module 210 and second module 212 can each maintain multiple counters. By maintaining multiple counters in first module 210, pedometer application 112 can count steps in the ambient mode for multiple users of client device 204. For example, a first ambient counter can count steps for a first user and a second ambient counter can count steps for a second user. Thus, if the first user is using client device 204, pedometer application 112 can increment the first ambient counter. Similarly, if the second user is using client device 204, pedometer application 112 can increment the second ambient counter. It will be understood that client device 204 can identify the first and second users using any suitable approach (e.g., face recognition, username/password entries, etc.).

In addition, by maintaining multiple counters in second module 212, pedometer application 112 can keep track of multiple independent sessions during each ambient period. This feature is described in greater detail in connection with FIGS. 7A and 7B.

The switching between the ambient mode and the session mode can be controlled by one or more modules in pedometer application 112. In some embodiments, the switching between the two modes can be controlled by step module 208. For example, step module 208 can detect a desired mode of operation directly from input component 106. After determining the desired mode of operation, step module 208 can broadcast the detected step only to the module corresponding to the desired mode. For example, step module 208 can broadcast detected steps to first module 210 if pedometer application 112 is currently operating in the ambient mode. Alternatively, step module 208 can broadcast detected steps to second module 212 if pedometer application 112 is currently operating in the session mode.

In other embodiments, the switching between the two modes can be controlled by first module 210 and/or second module 212. Because first and second modules 210 and 212 may control the switching between the two modes, step module 208 can simultaneously broadcast detected steps to first module 210 and second module 212 regardless of the desired mode of operation.

First and second modules 210 and 212 can determine that a session mode has been selected in any suitable manner. For example, second module 212 can directly detect the desired mode of operation from input component 106. Once second module 212 detects that a user has selected the session mode, second module 212 can send an enable signal to step module 208. For instance, an enable signal can be represented as a binary signal (e.g., an enable signal may be represented by setting the value of the binary signal to one, and a disable signal may be represented by setting the value of the binary signal to zero). First module 210 can then listen for the enable signal sent by second module 212 to step module 208. In response to detecting the enable signal, first module 210 can determine that the desired mode of operation is the session mode. As another example, first module 210 can directly detect the desired mode of operation from input component 106. Second module 212 can then listen for a disable signal from first module 210, and, in response to detecting the disable signal, can determine that the desired mode of operation has switched to the session mode.

The selection of either first module 210 or second module 212 as the listener module may depend on which mode is more frequently used. For instance, first module 210 can be selected as the listener module if pedometer application 112 more frequently operates in the ambient mode. Similarly, second module 212 can be selected as the listener module if pedometer application 112 more frequently operates in the session mode.

As yet another example, instead of detecting the desired mode of operation directly from input component 106, first and second modules 210 and 212 can detect the desired mode from step module 208. In such a case, step module 208 can detect the desired mode of operation from input component 106 and broadcast the desired mode along with the detected step to both first and second modules 210 and 212 (e.g., the desired mode of operation can be broadcasted as part of a message containing the detected step). Thus, first and second modules 210 and 212 can each observe the desired mode of operation without listening for an enable/disable signal.

In response to determining that a user has selected the session mode, first module 210 can pause the ambient counter such that the ambient counter no longer increments in response to receiving additional detected steps from step module 208. At the same time, second module 212 can start incrementing the session counter in response to receiving detected steps from step module 208.

Following the switch to the session mode, the user may select to end the session mode at any time using input component 106. In response to the user selecting to end the session mode, pedometer application 112 can switch back to the ambient mode. First module 210 and/or second module 212 can determine that the session mode has ended in any suitable manner. For example, if second module 212 directly detects the desired mode of operation from input component 106, second module 212 can send a disable signal (e.g., set the binary signal to zero) to step module 208. First module 210 can then listen for the disable signal, and, in response to detecting the disable signal, first module 210 can determine that the desired mode of operation has switched back to the ambient mode. As another example, if first module 210 directly detects the desired mode of operation from input component 106, first module 210 can send an enable signal to step module 208 in response to the user selecting to end the session mode. Second module 212 can then listen for the enable signal from first module 210, and, in response to detecting the enable signal, determine that the desired mode of operation has switched back to the ambient mode.

In response to determining that the user has selected to end the session mode, second module 212 can stop incrementing the session counter. At the same time, first module 210 can restart incrementing the ambient counter in response to receiving detected steps from step module 208.

By maintaining separate counters for each mode, pedometer application 112 can accurately count the number of steps walked by the user during a certain time period. Moreover, by continuously monitoring the desired mode of operation and switching between the ambient and session counters in response to detecting changes in the desired mode of operation, pedometer application 112 can seamlessly switch between the ambient and session modes.

Persons skilled in the art will appreciate that pedometer application 112 can include additional modules not shown in FIG. 2, including, for example, modules for maintaining other step counters. For instance, pedometer application 112 can include a third module for counting running steps detected by a motion sensor attached to or incorporated within a user's body or clothing (e.g., a motion sensor similar to the sensor from the Nike+iPod Sport Kit™ sold by Apple Inc. of Cupertino, Calif. and Nike Inc. of Beaverton, Oreg.). Thus, in addition to receiving steps detected by pedometer hardware 110, step module 208 can receive additional data from the motion sensor.

By receiving data from the motion sensor, pedometer application 112 can differentiate between several different types of steps. For example, the running module can maintain at least one running counter for monitoring running steps. Similar to the manner in which the ambient and session counters may be separately maintained, the running counter can also be maintained separately from the ambient and session counters. Thus, pedometer application 112 can switch between the walking modes (e.g., ambient and session modes) and the running mode by continuously monitoring the desired mode of operation and switching between the walking counters (e.g., ambient and session counters) and the running counter in response to detecting changes in the desired mode.

Figure 3:
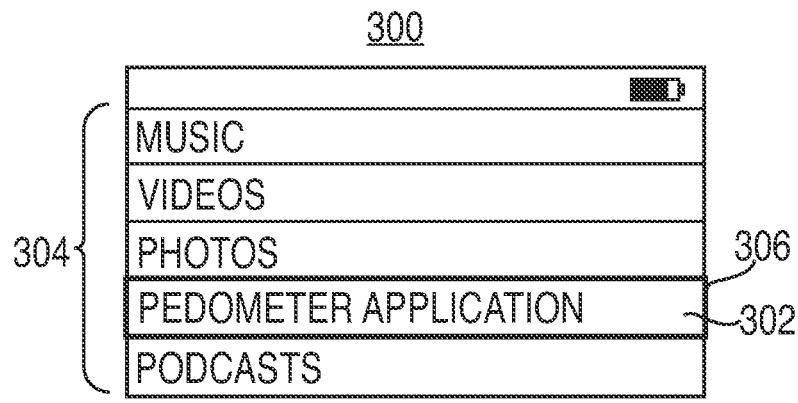
FIG. 3 shows a display screen of an illustrative listing of menu options in accordance with various embodiments of the invention.

In some embodiments, a user can select a pedometer application (e.g., pedometer application 112 of FIGS. 1 and 2) by using an input component (e.g., input component 106 of FIGS. 1 and 2) on an electronic device (e.g., electronic device 100 of FIG. 1 or client device 204 of FIG. 2). FIG. 3 shows a display screen of a listing of menu options, which can be provided by various embodiments of the electronic device. Display screen 300 can include "PEDOMETER APPLICATION" option 302 which can be an option in a listing of menu options 304. Persons skilled in the art will appreciate that although only the ambient and session modes of operation are discussed in connection with FIGS. 3-13, other modes of operation in addition to or instead of the ambient and session modes can also be maintained by the pedometer application.

The user may select "PEDOMETER APPLICATION" option 302 in any suitable manner. For example, as shown in display screen 300, "PEDOMETER APPLICATION" option 302 may be highlighted by highlight region 306. The user may move highlight region 306 by rotating a click wheel on the electronic device. Thus, while "PEDOMETER APPLICATION" option 302 is highlighted by highlight region 306, the user may select the pedometer application by clicking on the click wheel. As another example, the pedometer application can be represented as an icon on a home screen of an electronic device (e.g., an electronic device with a touch screen). The user may thus select the pedometer application by touching the icon.

Persons skilled in the art will appreciate that the user does not have to manually select the pedometer application in order to launch the application. For example, the pedometer application can continuously run in the background of the electronic device at all times, even while the electronic device is executing other applications or appearing to be in a sleep mode.

Figure 4:
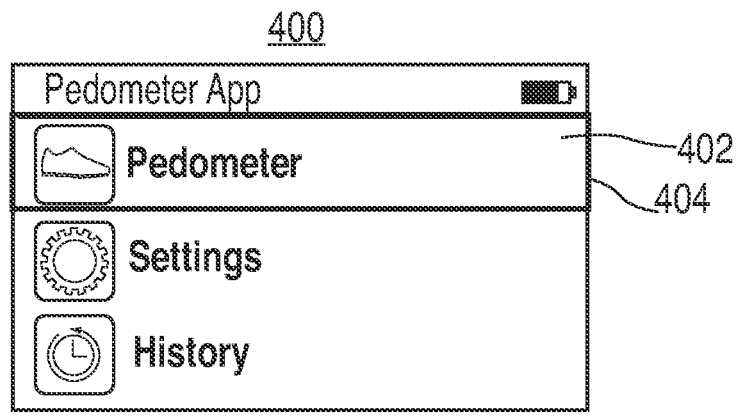
FIG. 4 shows a display screen of an illustrative top level menu of a pedometer application highlighting a first option in accordance with various embodiments of the invention.

In response to the user selecting "PEDOMETER APPLICATION" option 302, the electronic device can present a display screen associated with the pedometer application. FIG. 4 shows a display screen 400 of an illustrative top level menu of the pedometer application, which can be provided by various embodiments of the electronic device. Display screen 400 can include "PEDOMETER" option 402 highlighted by highlight region 404. From display screen 400, the user may select "PEDOMETER" option 402 by using an input component on the electronic device (e.g., by clicking a click wheel while "PEDOMETER" option 402 is highlighted by highlight region 404). The pedometer application can then present a display screen associated with "PEDOMETER" option 402.

Figure 5:
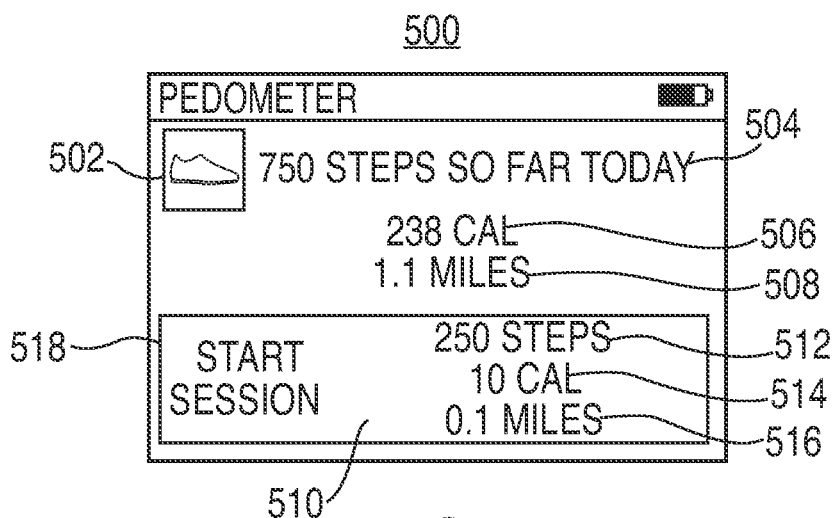
FIG. 5 shows a display screen associated with a first pedometer mode of a pedometer application in accordance with various embodiments of the invention.

For example, FIG. 5 shows a display screen 500 associated with "PEDOMETER" option 402. Display screen 500 can include icon 502, which can represent the current mode of operation of the pedometer application. In some embodiments, different icons can represent different modes of operation. As shown in display screen 500, for example, icon 502 may indicate that the current mode of operation is an ambient mode. In some embodiments, the user may customize the icon associated with a particular mode by selecting icon 502. For example, in response to the user selecting icon 502, the pedometer application can display a listing of images. The user may then select an image from the listing to associate with a particular mode.

Labels 504, 506, and 508 can provide step information associated with the total number of counted steps for a particular time period. For example, as shown in display screen 500, label 504 may show the total number of counted steps for a particular day. Labels 506 and 508 may respectively show the amount of calories burned and the number of miles counted for those steps.

In some embodiments, if the pedometer application is currently operating in the ambient mode, the pre-defined period can be the duration of the ambient mode (e.g., an ambient period). The ambient period can have a start time which can be specified by the user. For example, if the ambient period lasts 24 hours and the period starts at 12:00 am every day, labels 504, 506, and 508 can provide step information associated with the total number of steps counted since 12:00 am on a particular day. In some embodiments, the total number of counted steps can include steps counted in only the ambient mode or both the ambient and the session modes. As will be further described with respect to FIG. 9, the user may specify both the start time of the ambient period and also whether to include the steps counted in a session mode in the total number of counted steps of the ambient mode. Persons skilled in the art will appreciate that display screen 500 can include additional information associated with counted steps that are not shown in FIG. 5.

Display screen 500 can include "START SESSION" option 510, which can provide step information associated with one or more sessions that were activated during the ambient period. For example, as shown in display screen 500, labels 512, 514, and 516 may respectively show the number of steps counted, the number of calories burned, and the number of miles counted for a session mode activated during the 24-hour ambient period.

In some embodiments, if more than one session has been activated during an ambient period, the pedometer application can combine the step information obtained in each session. For example, labels 512, 514, and 516 can provide step information that has been combined for all of the sessions that have been activated within a particular ambient period. In other embodiments, the pedometer application can separately display the step information obtained in each session within a particular ambient period or for the most recent session within a particular ambient period.

The user may select to switch to the session mode by selecting "START SESSION" option 510. As shown in display screen 500, "START SESSION" option 510 can be highlighted by highlight region 518. Thus, in response to the user selecting option 510 using an input component of the electronic device (e.g., by clicking a click wheel while "START SESSION" option 510 is highlighted by highlight region 518), the pedometer application can present a display screen associated with switching to the session mode.

Figure 6:
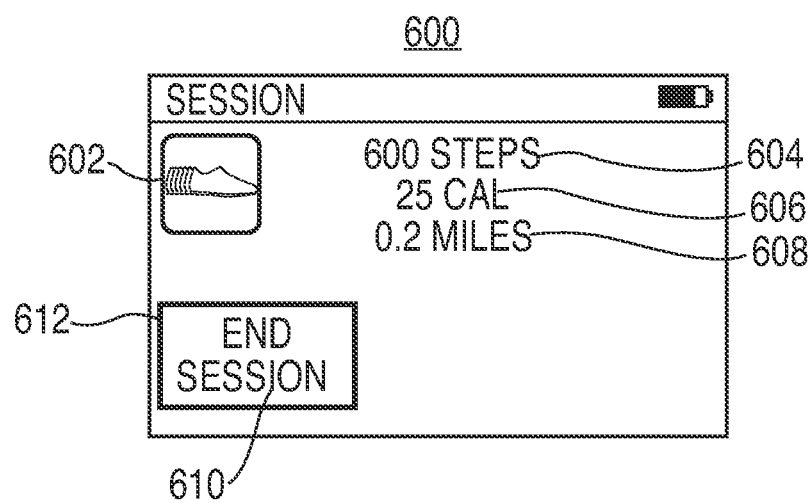
FIG. 6 shows a display screen associated with switching to a second pedometer mode of a pedometer application in accordance with various embodiments of the invention.

For example, FIG. 6 shows a display screen 600 associated with switching to a session mode. Display screen 600 can include icon 602, which can represent the current mode of operation of the pedometer application. As shown in display screen 600, icon 602 may indicate that the pedometer application is currently operating in the session mode. Similar to icon 502, the user may customize icons associated with different modes of operation by selecting icon 602. Persons skilled in the art will appreciate that if the pedometer application is currently operating in the session mode, display screen 600 may be displayed instead of display screen 500 (FIG. 5) in response to the user selecting a "PEDOMETER" option (e.g., "PEDOMETER" option 402 of FIG. 4).

Labels 604, 606, and 608 can provide step information associated with the number of steps that have been counted during one or more sessions of the current ambient period. In some embodiments, labels 604, 606, and 608 can provide step information accumulated for all of the sessions within a particular ambient period. For example, as shown in display screen 600, label 604 may show that the user has walked an additional 350 steps since the user selected "START SESSION" option 510 in FIG. 5. Thus, the number of steps counted in the session mode may now be 600 steps (e.g., increased from 250 steps as shown in label 512 of FIG. 5). In other embodiments, the pedometer application can display only the step information obtained in the current session.

Display screen 600 can include "END SESSION" option 610, which can provide an option for the user to end the session mode (e.g., end the current session). As shown in FIG. 6, "END SESSION" option 610 can be highlighted by highlight region 612. In response to the user selecting option 610 using an input component of the electronic device (e.g., by clicking a click wheel while "END SESSION" option 610 is highlighted by highlight region 612), the pedometer application can present a display screen associated with ending the session mode and switching back to the ambient mode.

Figure 7A:
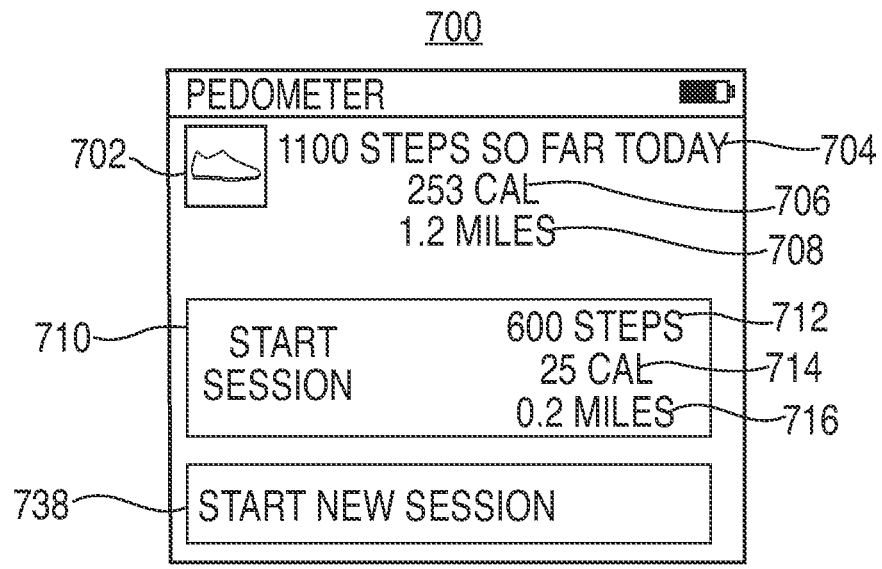
FIGS. 7A-7B show display screens associated with switching back to the first pedometer mode of a pedometer application in accordance with various embodiments of the invention.

For example, FIG. 7A shows a display screen 700 associated with switching back to the ambient mode. Display screen 700 can be similar to display screen 500. For example, display screen 700 can include icon 702, which, as shown, may indicate that the current mode of operation has switched back to the ambient mode. Similar to icons 502 and 602, the user may customize the icons associated with the different modes of operation by selecting icon 702.

Display screen 700 can include labels 704, 706, and 708. In some embodiments, if the user has decided to allow steps counted in the session mode to be included in the total number of counted steps of the ambient mode, labels 704, 706, and 708 can be updated with information obtained from the previous session. The values obtained from the previous session (e.g., information associated with the additional steps walked in the previous session) may thus be added to the values of labels 504, 506, and 508 of FIG. 5 to obtain the values of labels 704, 706, and 708 of FIG. 7A. For example, as shown in display screen 700, label 704 may show that the user has walked an additional 350 steps since the user selected "START SESSION" option 510 in FIG. 5. As a result, the total number of counted steps may now be 1100 steps (e.g., increased from 750 steps as shown in label 504 of FIG. 5).

In other embodiments, if the user has decided not to allow steps counted in the session mode to be included in the total number of counted steps of the ambient mode, labels 704, 706, and 708 can have the same values as labels 504, 506, and 508 (e.g., the values of the ambient mode before the session mode of FIG. 6 occurred).

Display screen 700 can include "START SESSION" option 710, which can provide step information associated with one or more sessions that were activated during the ambient period. "START SESSION" option 710 can include labels 712, 714, and 716.

In some embodiments, if the pedometer application has been configured to combine information obtained in each session, labels 712, 714, and 716 can be updated with step information obtained in the last session. The values obtained from the previous session (e.g., information associated with the additional steps walked in the previous session) may thus be added to the values of labels 512, 514, and 516 of FIG. 5 to obtain the values of labels 712, 714, and 716 of FIG. 7A. For example, as shown in display screen 700, label 712 may show that the user has walked an additional 350 steps since the user selected "START SESSION" option 510 in FIG. 5. As a result, the number of steps counted in the session mode may now be 600 steps (e.g., increased from 250 steps as shown in label 512 of FIG. 5).

Figure 7B:
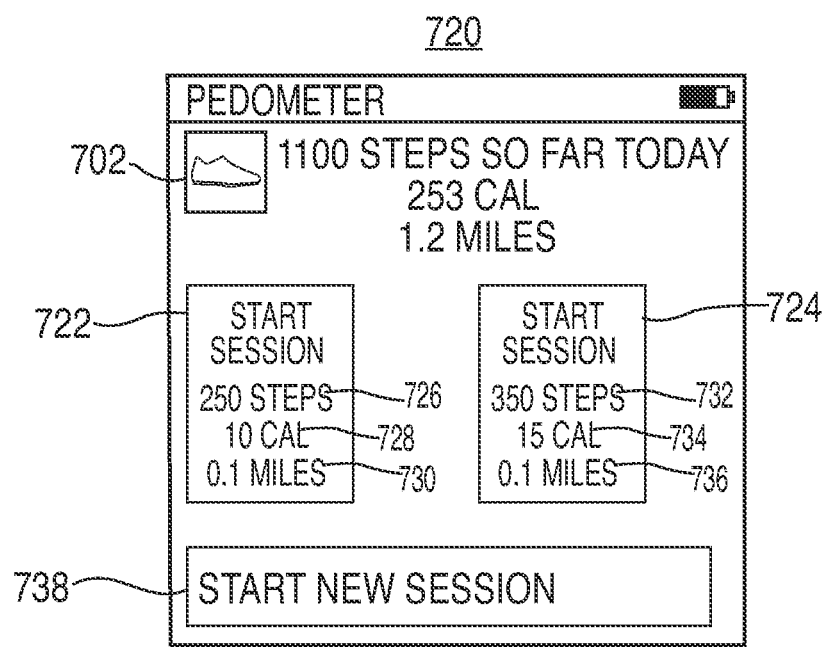

In other embodiments, the pedometer application can display the values obtained in the last session separately from the values provided by labels 512, 514, and 516. For example, FIG. 7B shows alternative display screen 720 associated with switching back to the ambient mode. Display screen 720 can include "START SESSION" options 722 and 724, which can provide step information associated with one or more sessions that were activated during the ambient period. "START SESSION" option 722 can include labels 726, 728, and 730, which can provide the same values as the values provided by labels 512, 514, and 516, respectively. "START SESSION" option 724 can include labels 732, 734, and 736, which can display only the values obtained in the last session.

From display screen 700 (FIG. 7A) or display screen 720 (FIG. 7B), the user may choose to restart the session mode by selecting "START SESSION" option 710 (FIG. 7A), "START SESSION" option 722 (FIG. 7B), or "START SESSION" option 724 (FIG. 7B) to switch to the session mode. In response to the user selecting to restart the session mode, the pedometer application can, for example, return to a display screen similar to display screen 600 (FIG. 6).

In some embodiments, the pedometer application can maintain step information for multiple sessions. For example, "START SESSION" option 722 and "START SESSION" option 724 can be two independent sessions that the user may activate. For instance, the user may restart a previous session by selecting "START SESSION" option 722. In response to the user selecting to end the session mode (e.g., by selecting "END SESSION" option 610 of FIG. 6), the pedometer application can update labels 726, 728, and 730 with the values obtained in the new session, while leaving the values in labels 732, 734, and 736 the same as before the new session started. Similarly, in response to the user selecting to end the session mode after selecting "START SESSION" option 724, the pedometer application can update labels 732, 734, and 736 with the values obtained in the new session, while leaving the values in labels 726, 728, and 730 the same as before the previous session was restarted. In some embodiments, the pedometer application can maintain steps counted for the multiple sessions by maintaining multiple counters in one or more modules on the electronic device (e.g. second module 212 on client device 204 of FIG. 2).

In addition, FIGS. 7A and 7B can include "NEW SESSION" option 738, which can allow a user to start a new session independent of any of the previous sessions activated during an ambient period. In response to the user selecting "NEW SESSION" option 738 on display screen 700 (FIG. 7A) or display screen 720 (FIG. 7B), the pedometer application can create a new session option on the display screen. The new session option can provide information associated with the steps walked in the new session. At the same time, the pedometer application can keep label values for the previous sessions the same as before the new session was started.

From display screen 700 (FIG. 7A) or display screen 720 (FIG. 7B), the user may also choose to return to the top level menu of the pedometer application (e.g., by pressing a menu button or selecting an option on the electronic device).

Figure 8:
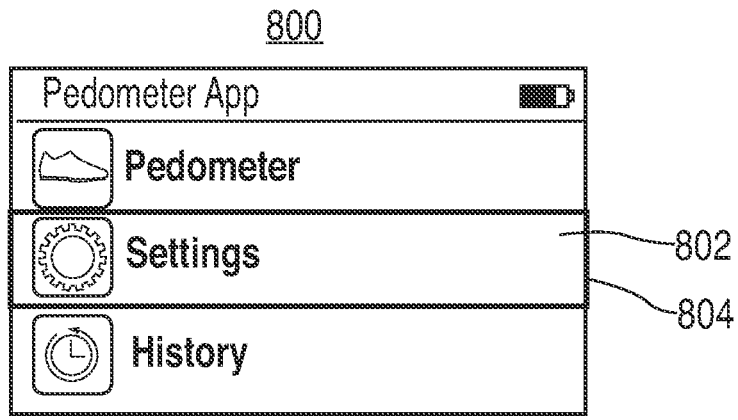
FIG. 8 shows a display screen of an illustrative top level menu of a pedometer application, similar to FIG. 4, highlighting a second option in accordance with various embodiments of the invention.

For example, FIG. 8 shows a display screen 800 of an illustrative top level menu of the pedometer application, similar to display screen 400 of FIG. 4. Display screen 800 can include "SETTINGS" option 802 highlighted by highlight region 804. From display screen 800, the user may select "SETTINGS" option 802 by using an input component on the electronic device (e.g., by clicking a click wheel while "SETTINGS" option 802 is highlighted by highlight region 804). The pedometer application can then present a display screen associated with "SETTINGS" option 802.

Figure 9:
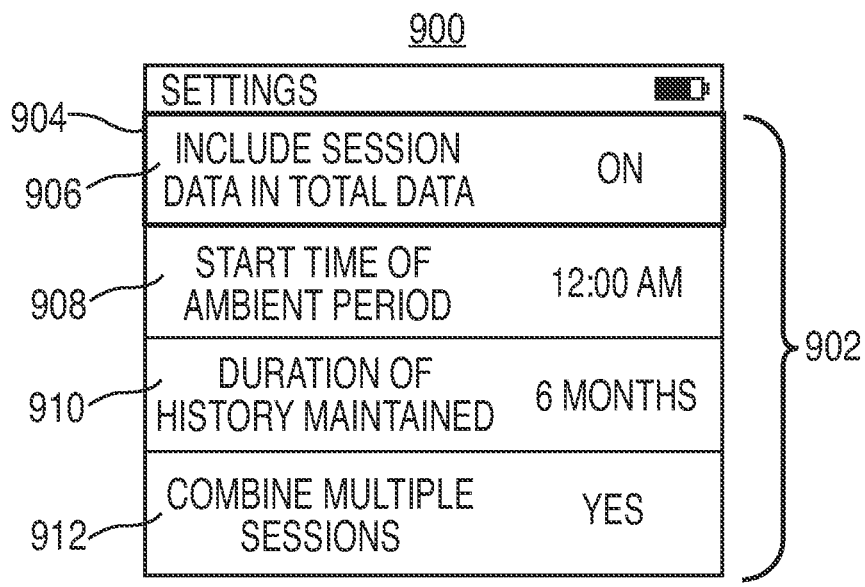
FIG. 9 shows a display screen associated with a settings option of a pedometer application in accordance with various embodiments of the invention.

For example, FIG. 9 shows a display screen 900 associated with "SETTINGS" option 802. Display screen 900 can include a listing of settings 902. In some embodiments, the user may change an option by rotating a click wheel once the option has been selected (e.g., once the option has been highlighted by highlight region 904). Persons skilled in the art will appreciate that the pedometer application can include options different from or additional to the options in FIG. 9.

Listing of settings 902 can include options 906, 908, 910, 912, which can modify the settings of one or more features of the pedometer application. Option 906 can control whether steps counted in the session mode are included in the total number of counted steps of the ambient mode (e.g., the data displayed by labels 504, 506, and 508 of FIG. 5 and labels 704, 706, and 708 of FIG. 7). As shown in display screen 900, the current value of option 906 is "ON". Thus, the steps counted in each session mode may be included in the total number of counted steps of the ambient mode. If the user instead changes the value of option 906 to "OFF", the total number of counted steps of the ambient mode may include only steps counted in the ambient mode. As such, the total number of counted steps of the ambient mode may not include steps counted in any of the session modes performed during the ambient period of the ambient mode.

Option 908 can control the start time of the ambient period of the ambient mode. As shown in display screen 900, for example, the ambient period may start at 12:00 am. In some embodiments, the user may choose a different start time for the ambient period of the ambient mode (e.g., the user may choose a start time coinciding with when the user usually wakes up). The pedometer application can perform one or more actions in response to the user selecting a new start time for the ambient period. The pedometer application can, for example, start to count steps based on the new start time, change one or more display settings, or any combination thereof. Display settings will be further described with respect to FIG. 13.

Option 910 can control the duration of historical step information stored by the pedometer application. As shown in display screen 900, for example, the pedometer application may currently store historical step information for up to 6 months. In some embodiments, option 910 can control only the duration of historical step information that is locally stored on the electronic device. Thus, a portion of historical step information that is older than the duration specified in option 910 can be (e.g., automatically) uploaded to a server (e.g., server 202 of FIG. 2). The historical step information can thus be deleted from memory (e.g., memory 104 of FIG. 1) on the electronic device (e.g., electronic device 100 of FIG. 1).

In some embodiments, in response to the user selecting a duration longer than the original duration specified in option 910, the pedometer application can download (e.g., from server 202) missing historical step information (e.g., older historical step information falling between the longer duration and the original duration). Similarly, in response to the user selecting a duration shorter than the original duration specified in option 910, the pedometer application can upload a portion of historical step information that is older than the shorter duration. In some embodiments, the pedometer application can determine whether the amount of memory (e.g., memory 104 of FIG. 1) available is below a pre-defined threshold (e.g., 30% of the total capacity). In response to determining that the amount of memory available is below the pre-defined threshold, the pedometer application can automatically decrease the duration of historical step information locally stored on the electronic device. The pedometer application can also automatically upload a portion of historical step information (e.g., older historical step information) to the server until the amount of memory available is above the pre-defined threshold. Moreover, while the amount of memory available is at or below the pre-defined threshold, the pedometer application can prevent the user from increasing the duration of the historical step information locally stored on the electronic device.

In some embodiments, listing of settings 902 can include an additional option for a user to manually delete historical step information. For example, a user may select one or more of the previously stored historical step information (e.g., step information from one or more ambient periods or step information from one or more sessions) to delete from the electronic device. In response to receiving the user selection, the pedometer application can delete the selected step information from memory (e.g., memory 104 of FIG. 1) on the electronic device. In some cases, the pedometer application can simultaneously upload the selected step information to the server.

Historical step information can include any suitable step information associated with the number of counted steps. For example, historical step information can include the number of steps counted during each ambient period. As another example, historical step information can include the number of steps counted during one or more sessions within each ambient period. In addition to the steps counted, historical step information can include additional information, such as the calories burned and the miles counted for those steps, for example.

Option 912 can control the storage and display of step information for multiple sessions activated during an ambient period. For example, option 912 can control the display of step information for labels 512, 514, and 516 of FIG. 5, labels 604, 606, and 608 of FIG. 6, and labels 712, 714, and 716 of FIG. 7. As shown in display screen 900, for example, the current value of option 912 may be "YES". Thus, step information obtained in all of the sessions within a particular ambient period can be combined (e.g., as is the case illustrated in FIGS. 5-7). If, on the other hand, the user sets the value of option 912 to "NO", the step information obtained in each session within a particular ambient period can be separately displayed. In other embodiments, only the step information obtained for the most recent session within a particular ambient period may be displayed.

From display screen 900, the user may choose to return to the top level menu of the pedometer application (e.g., by pressing a menu button or selecting an option on the electronic device).

Figure 10:
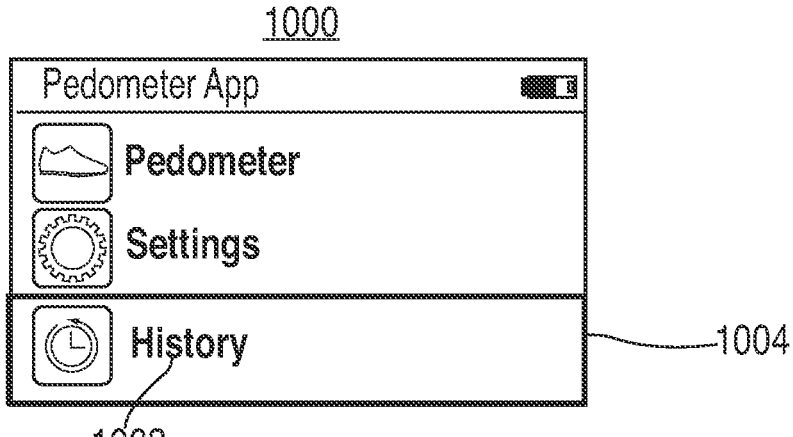
FIG. 10 shows a display screen of an illustrative top level menu of a pedometer application, similar to FIGS. 4 and 8, highlighting a third option in accordance with various embodiments of the invention.

For example, FIG. 10 shows a display screen 1000 of an illustrative top level menu of the pedometer application, which may be similar to display screen 400 of FIG. 4 and display screen 800 of FIG. 8. Display screen 1000 can include "HISTORY" option 1002 highlighted by highlight region 1004. From display screen 1000, the user may select "HISTORY" option 1002 using an input component of the electronic device (e.g., by clicking on a click wheel while "HISTORY" option 1002 is highlighted by highlight region 1004). The pedometer application can then present a display screen associated with "HISTORY" option 1002.

Figure 11:
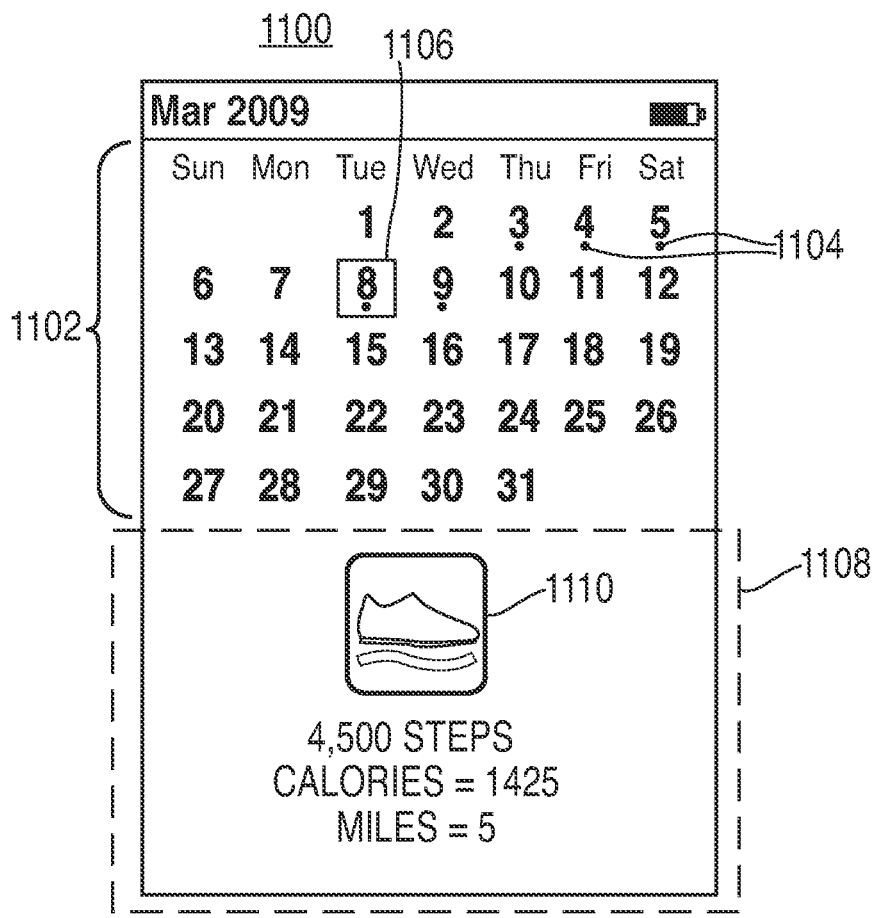
FIG. 11 shows a display screen for providing monthly historical step information of a pedometer application in accordance with various embodiments of the invention.

For example, FIG. 11 shows a display screen 1100 for providing historical step information. Display screen 1100 can include calendar 1102, which can represent days in a particular month. Persons skilled in the art will appreciate that calendar 1102 can represent any suitable time period and that entries in calendar 1102 can represent any suitable duration within the time period. For example, calendar 1102 can be a yearly calendar, wherein the individual entries are months of the year.

In some embodiments, calendar 1102 can display session indicators 1104 on one or more days. For example, the pedometer application can identify one or more days during which step information for one or more sessions was obtained (e.g., session duration). Session indicators 1104 can then be displayed in calendar 1102 for those days. As another example, session indicators 1104 can be displayed for those days during which step information for any mode of operation was obtained.

Display screen 1100 can include highlight region 1106. As shown in display screen 1100, for example, highlight region 1106 may currently highlight March 8$^{th}$. Using an input component of the electronic device (e.g., rotating a click wheel), the user may move highlight region 1106 over different days in the month.

When highlight region 1106 is placed over a particular day, step information about the counted steps obtained during that day can be displayed in information region 1108. In some embodiments, for a particular day, the pedometer application can identify the modes of operation used that day. The pedometer application can then combine step information obtained in each mode of operation. The combined step information can be displayed in information region 1108.

Step information displayed in information region 1108 can include, for example, the total number of steps and the total number of miles counted during the day. In addition, the step information can include the total number of calories burned during the day. Information region 1108 can include icon 1110 which can show one or more modes of operation that have been identified as being associated with the particular day. In some embodiments, if the user used both the ambient mode and the session mode, icon 1110 can be selected to be different from the icons representing either the ambient or session mode. For example, as shown in display screen 1100, on March 8$^{th}$ the user walked 4,500 steps, burned 1425 calories, and walked 5 miles. In addition, icon 1110 shows that the user used both the ambient mode and the session mode. Persons skilled in the art will appreciate that information region 1108 can include additional step information not shown in FIG. 11, such as independent step information for each of the modes of operation used during a particular day.

From display screen 1100, the user may choose to return to the top level menu of the pedometer application (e.g., by pressing a menu button or selecting an option on the electronic device).

Instead of returning to the top level menu of the pedometer application, however, the user may choose to view step information associated with steps counted during a particular day. In response to the user selecting a particular day (e.g., by clicking the click wheel while highlight region 1106 is highlighting the particular day of interest), the pedometer application can display step information for the particular day (e.g., additional step information not shown by region 1108).

Figure 12A:
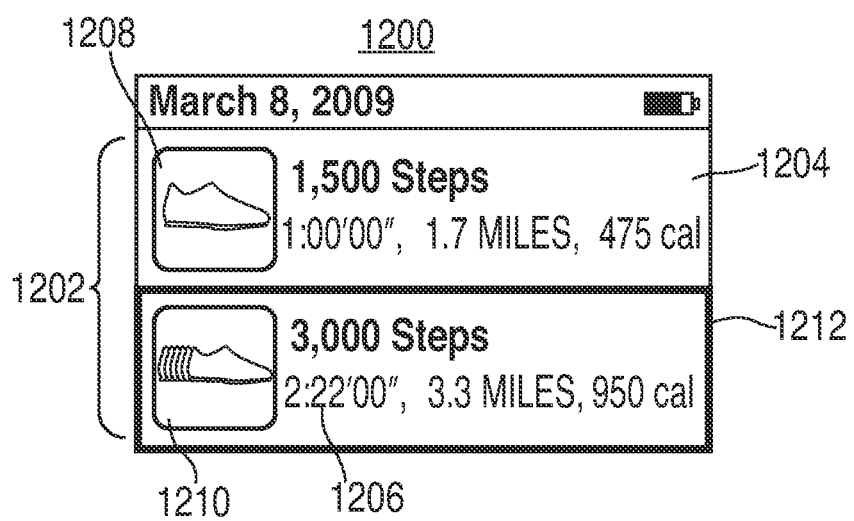
FIGS. 12A-12B show display screens for providing daily historical step information of a pedometer application in accordance with various embodiments of the invention.

For example, FIG. 12A shows a display screen 1200 for providing daily historical step information. Display screen 1200 can include a listing of step information 1202. Listing of step information 1202 can display step information associated with a particular day. The step information can include, for example, the number of steps, the duration, and the number of miles that were counted during the day. In addition, the step information can include the number of calories burned during the day.

Listing of step information 1202 can also include mode options 1204 and 1206. In some embodiments, mode options 1204 and 1206 can represent step information for each mode of operation used that day. For example, mode option 1204 can display step information associated with steps counted in the ambient mode that day, while mode option 1206 can display step information associated with steps counted in the session mode that day. Icons associated with each mode option can also be displayed. For example, icon 1208 can be displayed for the ambient mode, and icon 1210 can be displayed for the session mode.

Persons skilled in the art will appreciate that listing of step information 1202 can include additional mode options not shown in FIG. 12. For example, listing of step information 1202 can include additional mode options for additional modes of operation of the pedometer application. As another example, if the pedometer application was configured to separately display multiple sessions for each ambient period and multiple sessions were obtained during the particular ambient period, listing of step information 1202 can include a mode option for each session.

Figure 12B:

As another example, FIG. 12B shows another display screen 1214 for providing daily historical step information. Display screen 1214 may be displayed instead of display screen 1200, for example, if only a single mode of operation was used for a particular day. For instance, if only the ambient mode or the session mode was used for a particular day of interest, display screen 1214 may be displayed in response to the user selecting the particular day while the day is highlighted by highlight region 1106 (FIG. 11) in calendar 1102 (FIG. 11). As another example, display screen 1214 may be displayed in response to the user selecting a particular mode option (e.g., mode option 1204 or mode option 1206 of FIG. 12A) in display screen 1200 (FIG. 12A).

Display screen 1214 can include step information 1216, which can display the number of steps counted in a particular mode of operation for the day. Moreover, display screen 1214 can include a listing of step information 1218. Listing of step information 1218 can display step information associated with the mode of operation. The step information can include, for example, the step goal, the duration, the start time, the end time, the number of miles, and the number of calories for the particular day. In addition, the step information can include the weekly and monthly totals.

From display screen 1214, the user may choose to return to viewing monthly historical step information (FIG. 11) or return to viewing step information for all of the modes of operation used for the particular day (FIG. 12A). The user may, for example, press a menu button or select an option on the electronic device. However, the user may instead choose to view a graphical history of step information by selecting "GRAPH" option 1220. This will be further described in connection with FIG. 13.

Returning back to display screen 1200 (FIG. 12A), the user may choose to return to viewing monthly historical step information (e.g., by pressing a menu button or selecting an option on the electronic device).

However, instead of returning to viewing monthly historical step information, the user may choose to view a graphical history of step information. The user may select to view a graphical history of step information by selecting a particular mode of operation. In response to the user selecting a particular mode option (e.g., by clicking the click wheel while highlight region 1212 is highlighting mode option 1206), the pedometer application can provide a graphical history of step information.

Figure 13:
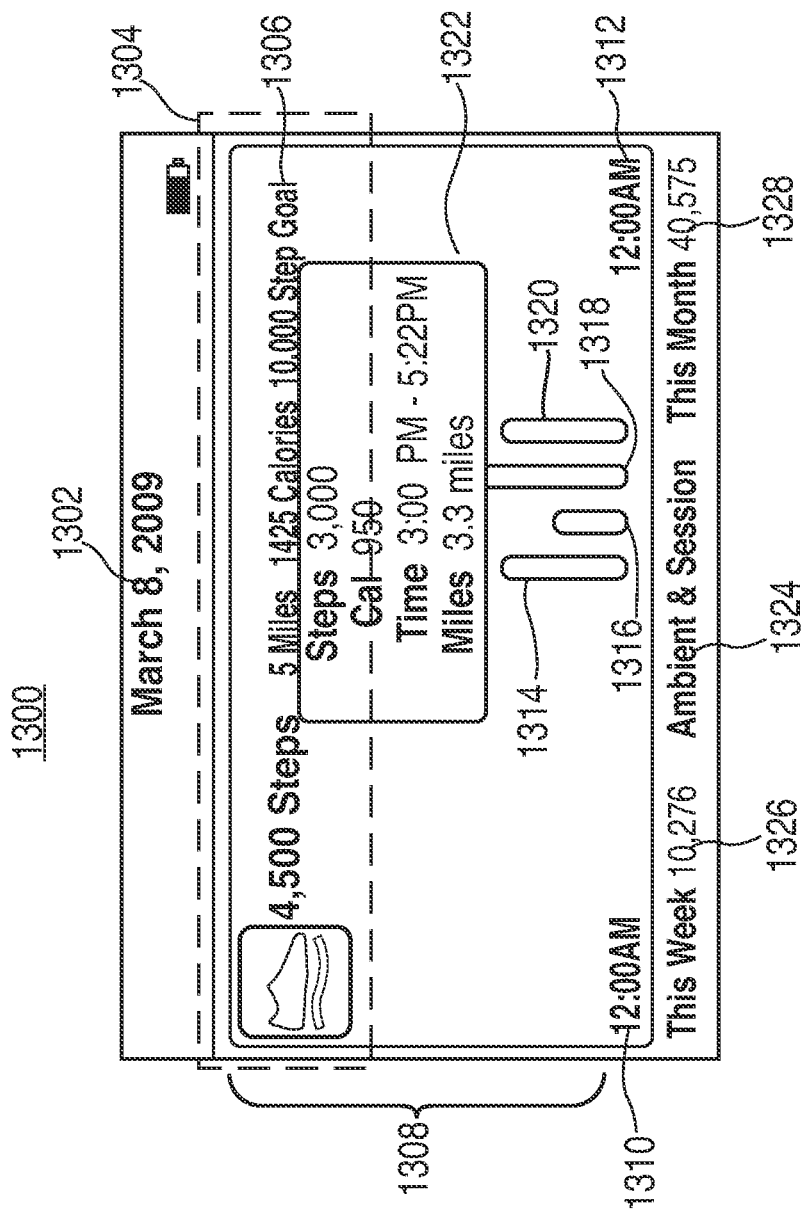
FIG. 13 shows a display screen for providing a graphical history of step information of a pedometer application in accordance with various embodiments of the invention.

For example, FIG. 13 shows a display screen 1300 for providing a graphical history of step information. Persons skilled in the art will appreciate that display screen 1300 can be accessed by the user in any suitable manner in the pedometer application. Thus, display screen 1300 does not necessarily have to follow display screen 1200 (FIG. 12). For example, in response to the user selecting a particular day in display screen 1100 (FIG. 11), the pedometer application can provide display screen 1300 for a graphical history corresponding to the selected day. As another example, in response to the user selecting a "GRAPH" option (e.g., "GRAPH" option 1220 of FIG. 12B), the pedometer application can provide display screen 1300 for a graphical history corresponding to the day.

Display screen 1300 can include label 1302, which can show the date corresponding to the step information displayed in display screen 1300. Display screen 1300 can also include information region 1304. Information region 1304 can include information similar to information region 1108 of FIG. 11. Information region 1304 can include, for example, the total number of steps and the total number of miles that were counted during the day. In addition, information region 1304 can include the total number of calories burned and an icon representing one or more modes of operation activated during the day.

In some embodiments, information region 1304 can display goal information 1306. Goal information 1306 can include any suitable information that has been previously set as an exercise goal for that day. For example, goal information 1306 can include goals for steps counted, miles counted, duration counted, calories burned, any other suitable goal, or any combination thereof.

Display screen 1300 can include graph region 1308. In some embodiments, graph region 1308 can include start time 1310 and end time 1312 corresponding to the start time and the end time of the ambient period. For example, as shown in display screen 1300, the ambient period may start at 12:00 am on March $8^{th}$. Because the ambient period may last for a 24-hour period, for example, the ambient period may end at 12:00 am on March $9^{th}$. The start time of the ambient period can be a display setting that can be changed based on one or more options provided by the pedometer application (e.g., the user may change the start time to 7:00 am by selecting option 908 of FIG. 9). In response to the user selecting to change the start time of the ambient mode, the pedometer application can determine updated steps based on the changed start time. For example, in response to the user changing the start time to 7:00 am, the pedometer application can determine counted steps from 7:00 am on March $8^{th}$ to 7:00 am on March $9^{th}$. The pedometer application can then display a new graphical representation of the updated step count. As another example, the pedometer application can recalculate the totals provided in information region 1304 based on the changed start time.

Step information can be displayed in graph region 1308 using any suitable set of time increments. As shown in display screen 1300, for example, graph region 1308 may be divided into hourly time increments. The set of time increments selected can depend on the frequencies used to store step information (e.g., the set of time increments can be limited by the least frequently stored step information). For example, step information for the ambient mode of operation can be stored at 10-minute increments for a total of 144 data points over a particular day. However, step information for the session mode of operation can be stored at 60-minute increments for a total of 24 data points over a particular day. In such an example, the smallest set of time increments that can be displayed in graph region 1308 are hourly increments. As another example, if step information for both the ambient mode and the session mode of operation are stored at minute increments, the smallest set of time increments that can be displayed are minute increments.

The frequencies used to store step information can depend on one or more factors. For example, the user may want to closely examine step information associated with the session mode of operation. Thus, the pedometer application can store step information for the session mode at smaller time increments. As another example, the user may want to keep a reliable history of step information associated with the ambient mode of operation. Thus, the pedometer application can store step information for the ambient mode at smaller time increments. As yet another example, the pedometer application can determine that the electronic device has limited storage capacity in memory, and, as a result, increase the time increments for storing step information.

For each time increment in graph region 1308, the pedometer application can display a graphical representation of the steps counted during that time increment. In other embodiments, the representation can display any other information obtained for each time increment, such as, for example, calories burned, miles walked, and the like. The graphical representation can include any suitable type of graphical representation, such as, for example, a bar graph, a line graph, a scatter plot and/or any other suitable 2-dimensional or 3-dimensional graph.

The graphical representation type of the steps counted can change depending on the mode of operation. For example, for each time increment, the pedometer application can determine all of the modes of operation activated during the time increment. The pedometer application can then select a graphical representation type for each time increment based on the determined modes of operation. The graphical representation type can be unique to the modes of operation determined for each time increment (e.g., different colors and/or patterns can represent the ambient mode, the session mode, and a combined ambient/session mode). As a result, for a time increment in which steps were counted in multiple modes of operation (e.g., the combined ambient/session mode), the pedometer application can combine the steps counted in each mode and select a graphical representation type that is different (e.g., a different pattern and/or color) from time increments in which only one mode of operation was determined. Alternatively, for a time increment in which steps were counted in multiple modes of operation, the pedometer application can represent the steps counted in each mode separately (e.g., as adjacent bars or as bars placed on top of each other).

As shown in display screen 1300, for example, bar 1314 may be used to represent the number of steps counted in the ambient mode. In addition, bars 1316, 1318, and 1320 may be used to represent the number of steps counted in the session mode, in which each bar represents the number of steps counted for each hour. Bars 1316, 1318, and 1320 may include all of the steps counted for a single session. In some embodiments, the pedometer application can choose different graphical representation types for steps counted for different users and/or steps counted in different sessions (e.g., by selecting bars of different colors and/or patterns).

In addition to displaying a graphical representation of the counted steps, the pedometer application can display step information associated with a particular mode of operation. For example, in response to the user selecting to view a graphical history of step information for a particular mode (e.g., by selecting mode option 1206 of FIG. 12), the pedometer application can display mode information 1322.

For example, mode information 1322 can include information similar to the information provided in listing of step information 1202 (FIG. 12), such as, for example, the number of steps counted, the number of miles counted, and the number of calories burned in the particular mode of operation. In addition, the pedometer application can display the time period during which step information was obtained in the particular mode of operation. For example, as shown in display screen 1300, for the session mode, step information was obtained from 3:00 pm to 5:22 pm. Mode information 1322 can be placed at any suitable location on display screen 1300. Mode information 1322 can, for example, be overlaid on top of graph region 1308, extend from one or more bars representing the steps counted for a particular mode of operation, or any combination thereof.

In some embodiments, goal information 1306 can be represented in graph region 1308. For example, for a monthly graphical representation of the steps counted, the pedometer application can display a line, where each data point on the line represents the step goal for each day of the month.

Display screen 1300 can also include display option 1324, which can indicate the types of steps that are graphically displayed in graph region 1308. For example, display option 1324 can indicate that the steps represented in graph region 1308 include the ambient mode, the session mode, or any combination thereof. As shown in display screen 1300, both ambient mode steps and session mode steps are displayed.

In some embodiments, the user may select display option 1324 to change the type of steps that are graphically displayed in graph region 1308. For example, display option 1324 can be a toggle option. Thus, in response to the user selecting display option 1324 (e.g., by rotating a click wheel), the pedometer application can change the type of steps displayed in graph region 1308 and correspondingly change the type of steps indicated in display option 1324. As an example, after the user selects display option 1324 in display screen 1300, the pedometer application can display counted steps for only the ambient mode in graph region 1308, and change display option 1324 to indicate "AMBIENT ONLY".

Indicators 1326 and 1328 can be any suitable indicators of totals calculated over time. Suitable indicators can include, for example, hourly, daily, weekly, monthly, and yearly totals. Indicators 1326 and 1328 can change depending on the set of time increments used in graph region 1308. For example, weekly and monthly totals can be displayed when daily increments are used in graph region 1308. As another example, monthly and yearly totals can be displayed when weekly increments are used in graph region 1308.

Graph region 1308 can be interactive such that the user may change the information displayed in graph region 1308 by manipulating display screen 1300. In some embodiments, the user may view mode information for each mode of operation by selecting an input using an input component of the electronic device (e.g., by rotating a click wheel). For example, in response to the user selecting to view mode information for the ambient mode of operation in graph region 1308, the pedometer application can remove mode information 1322 and can display mode information for the ambient mode (e.g., the mode information can extend from bar 1314).

In some embodiments, the user may select to either increase or decrease the set of time increments in graph region 1308. For example, the user may select one or more inputs using an input component to view step information displayed in increasingly smaller time increments (e.g., from hours to minutes to seconds). The user may, for example, rotate a click wheel to the right or perform a "pinch-out" motion on a touch screen of the electronic device. As another example, the user may select one or more inputs using an input component to view step information displayed in increasingly larger time increments (e.g., from hours to days to months). The user may, for example, rotate a click wheel to the left or perform a "pinch-in" motion on a touch screen of the electronic device. In response to the user selecting to change the set of time increments in graph region 1308, the pedometer application can reorganize step information based on the new set of time increments in order to properly display the step information (e.g., the pedometer application can combine multiple sets of step information for longer time increments).

In some embodiments, the user may view step information for consecutive time periods. For example, the user may select one or more inputs using an input component to view step information for the previous time period (e.g., the previous day, month, year, or any other suitable time period). The user may, for instance, press a button, shake the electronic device in a particular pattern, and/or slide a finger to the right on a touch screen of the electronic device. Similarly, the user may select one or more inputs using an input component to view step information for the next time period (e.g., the next day, month, year, or any other suitable time period). The user may, for instance, press a button, shake the electronic device in a particular pattern, and/or slide a finger to the left on a touch screen of the electronic device. Thus, in the example shown in display screen 1300 of FIG. 13, the pedometer application can display step information for either March 7$^{th}$ or March 9$^{th}$ depending on whether the user selects to view step information for the previous time period or the next time period.

From display screen 1300, the user may choose to return to viewing step information associated with steps counted during a particular day (e.g., by pressing a menu button or selecting an option on the electronic device). In response to the user input, the pedometer application may return to display screen 1200 of FIG. 12.

Instead of returning to the step information associated with steps counted during a particular day, the user may instead choose exit the pedometer application (e.g., by pressing a home button on the electronic device).

Figure 14:
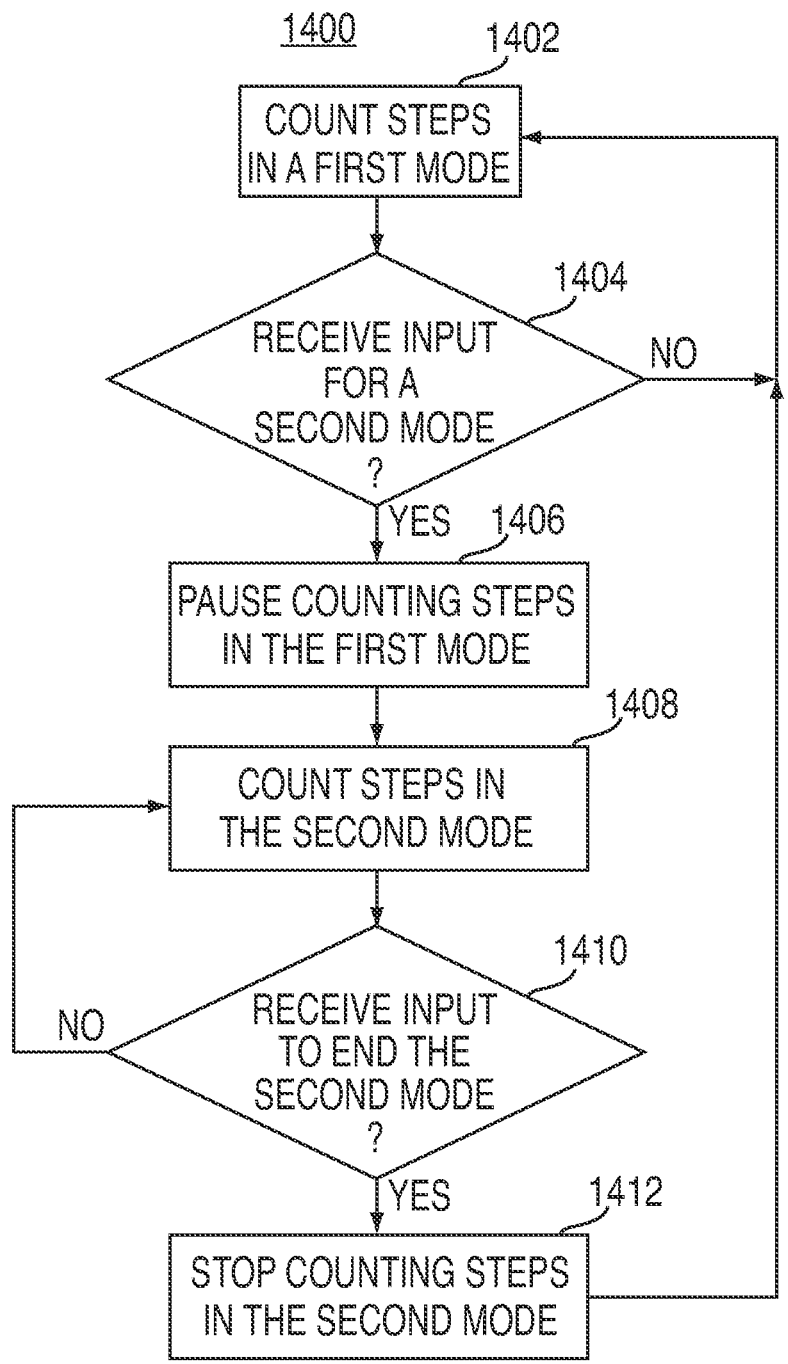
FIG. 14 shows a flowchart of an illustrative process for switching between multiple pedometer modes in accordance with various embodiments of the invention.
Figure 15:
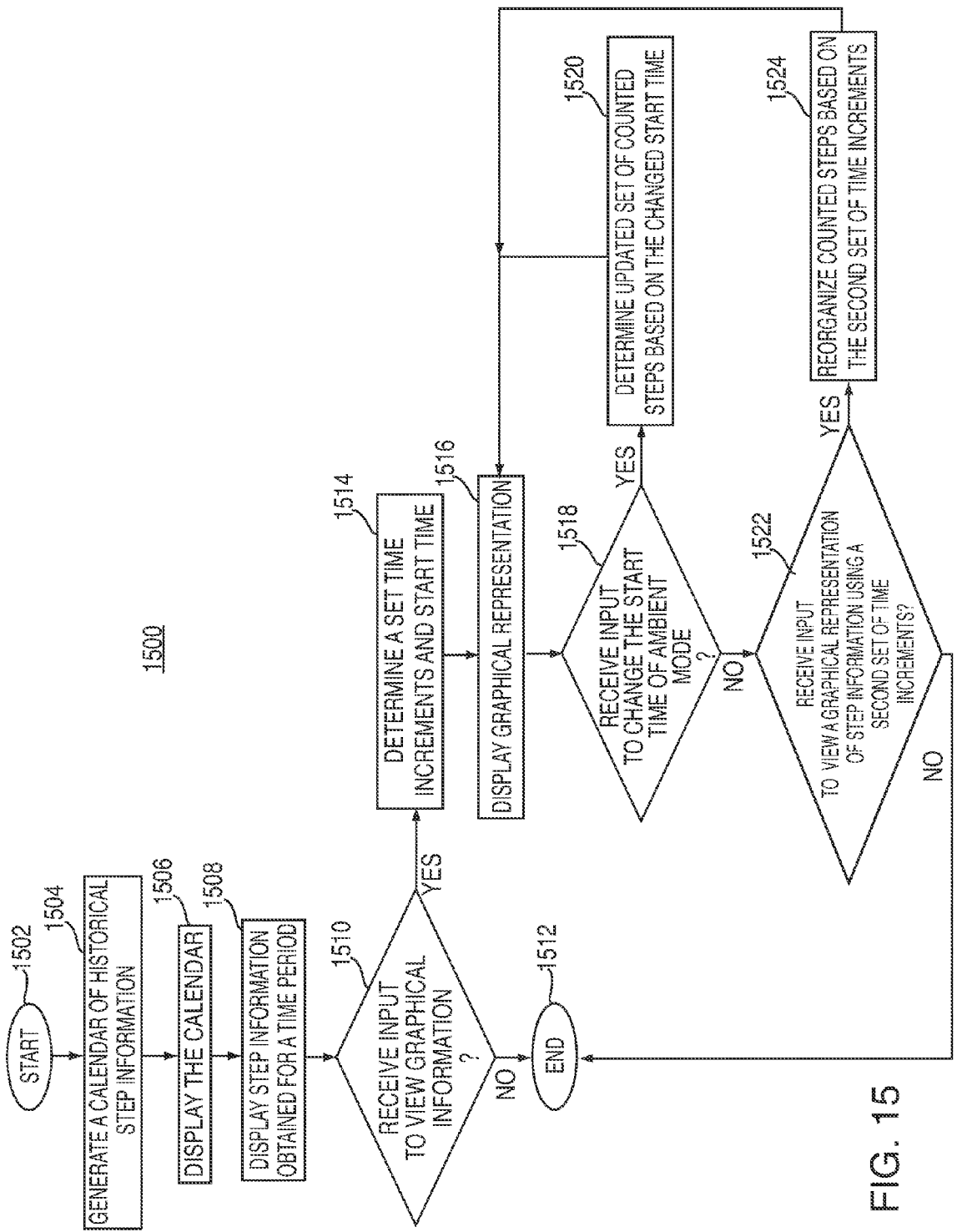
FIG. 15 shows a flowchart of an illustrative process for providing historical step information of a pedometer application in accordance with various embodiments of the invention.
Figure 16:
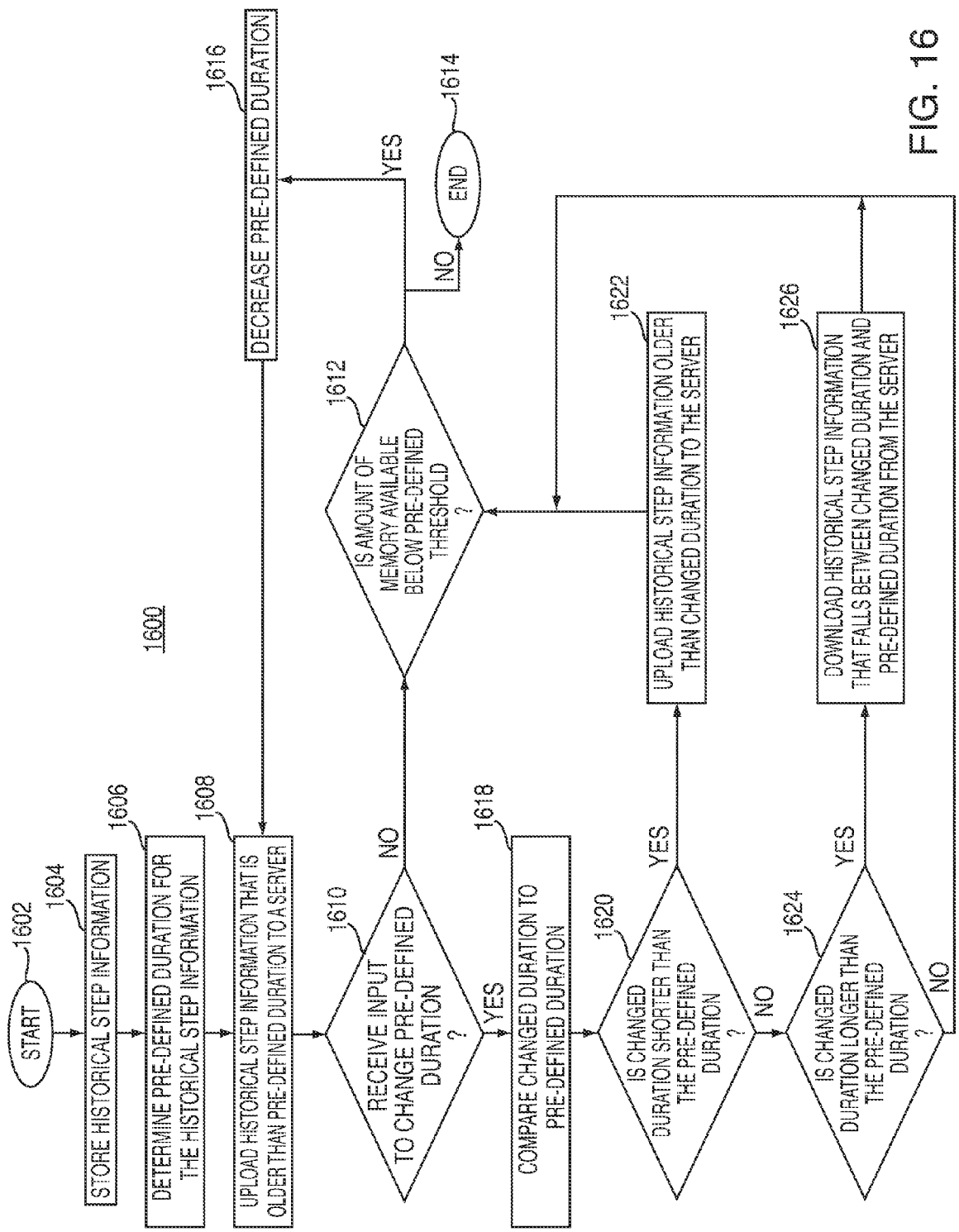
FIG. 16 shows a flowchart of an illustrative process for storing historical step information of a pedometer application in accordance with various embodiments of the invention.

Referring now to FIGS. 14-16, flowcharts of illustrative processes are shown in accordance with various embodiments of the invention. The processes may be executed by an electronic device, such as electronic device 100 of FIG. 1 or client device 204 of FIG. 2, or the steps may correspond to machine-readable instructions recorded on machine-readable media (e.g., computer-readable media, memory 104 of FIG. 1, etc.). It should be understood that these processes are merely illustrative. Any of the steps may be combined, removed, or modified, and any steps may be added, without departing from the scope of the invention.

Referring first to FIG. 14, a flowchart of illustrative process 1400 is shown for seamlessly switching between multiple pedometer modes. Process 1400 may begin at step 1402 where the pedometer application can count steps in a first mode. For example, the first mode can be an ambient mode (e.g., the steps can be counted by first module 210 of FIG. 2). Thus, in response to the user selecting a "PEDOMETER" option (e.g., "PEDOMETER" option 402 of FIG. 4) while the pedometer application is operating in the ambient mode, the pedometer application can present a display screen similar to display screen 500 (FIG. 5).

At step 1404, the pedometer application can determine whether an input for a second mode has been received. For example, the pedometer application can determine whether an input for a session mode has been received. The pedometer application can determine, for instance, whether the user has selected a "START SESSION" option (e.g., "START SESSION" option 510 of FIG. 5 or "START SESSION" option 710 of FIG. 7). If the pedometer application determines that an input for a second mode has not been received, process 1400 may move back to step 1402 and continue counting steps in the first mode. Otherwise, process 1400 may continue to step 1406.

At step 1406, the pedometer application can pause the counting of steps in the first mode. Then, at step 1408, the pedometer application can count steps in the second mode. For example, the second mode can be a session mode (e.g., the steps can be counted by second module 212 of FIG. 2). Thus, in response to the user selecting a "START SESSION" option, the pedometer application can present a display screen similar to display screen 600 (FIG. 6).

In other embodiments, the pedometer application can simultaneously count steps in both the first and second modes when an input for the second mode is received. Thus, in response to receiving an input for the second mode at step 1404, the pedometer application can continue counting steps in the first mode (e.g., by skipping step 1406). Furthermore, after the pedometer application stops counting steps in the second mode at step 1412, process 1400 may move to step 1404 instead of step 1402. In such an implementation, in response to a user input to display only the number of counted steps for the first mode exclusive of the second mode, the pedometer application can subtract the number of steps counted in the second mode from the number of steps counted in the first mode.

At step 1410, the pedometer application can determine whether an input to end the second mode has been received. For example, the pedometer application can determine whether the user has selected an "END SESSION" option (e.g., "END SESSION" option 610 of FIG. 6). If not, process 1400 may move back to step 1408 and continue counting steps in the second mode. Otherwise, process 1400 may continue to step 1412.

At step 1412, the pedometer application can stop counting steps in the second mode. Then, process 1400 may move back to step 1402 and continue counting steps in the first mode. Thus, in response to the user selecting an "END SESSION" option, the pedometer application can present a display screen similar to display screen 700 (FIG. 7).

FIG. 15 shows a flowchart of an illustrative process for providing historical step information. Process 1500 may begin at step 1502. At step 1504, the pedometer application can generate a calendar of historical step information, and at step 1506, the pedometer application can display the calendar. For example, the pedometer application can present a display screen similar to display screen 1100 (FIG. 11).

Then, at step 1508, the pedometer application can display step information obtained for a time period. The pedometer application can, for example, display step information obtained for the time period in an information region of the display screen (e.g., information region 1108 of FIG. 11) or in its own display screen (e.g., display screen 1200 of FIG. 12). The step information can include the number of steps counted during the time period.

At step 1510, the electronic device can determine whether an input to view graphical information has been received. For example, the user may select to view graphical information by selecting a day in a calendar (e.g., a day highlighted by highlight region 1106 of FIG. 11) or selecting a particular mode option (e.g., mode option 1206 in listing of step information 1202 of FIG. 12). If the electronic device determines that an input to view graphical information has not been received, process 1500 may end at step 1512. Otherwise, process 1500 may move to step 1514.

At step 1514, the pedometer application can determine a set of time increments and a start time for the graphical representation. For example, the set of time increments can be based on frequencies used to store the counted steps for the time period. The start time can be the same as the start time for the ambient mode of operation. At step 1516, the pedometer application can display the graphical representation.

Then, at step 1518, the pedometer application can determine whether a request to change the start time of the ambient mode has been received. For example, the user may change the start time by selecting a settings option (e.g., option 908 of FIG. 9). If the pedometer application determines that a request to change the start time has been received, process 1500 may move to step 1520.

At step 1520, the pedometer application can determine an updated set of counted steps based on the changed start time. After the updated set of counted steps has been determined, process 1500 may return to step 1516, where the pedometer application can display a graphical representation based on the updated set of counted steps.

Returning to step 1518, if the pedometer application instead determines that a request to change the start time has not been received, the pedometer application can move to step 1522.

At step 1522, the pedometer application can determine whether a request to view a graphical representation of step information using a second set of time increments has been received. The user may select a second set of time increments by using one or more inputs of the electronic device. The user may, for example, rotate a click wheel or perform a pinching motion on a touch screen of the electronic device. If the pedometer application determines that a request to view a graphical representation using a second set of time increments has not been received, process 1500 may end at step 1512. Otherwise, process 1500 may move to step 1524.

At step 1524, the pedometer application can reorganize the counted steps based on the second set of time increments. Then, process 1500 may return to step 1516 where the pedometer application can display a graphical representation based on the reorganized steps.

Referring now to FIG. 16, a flowchart of illustrative process 1600 is shown for storing historical step information. Process 1600 may start at step 1602. Then, at step 1604, the pedometer application can store historical step information locally on the electronic device.

At step 1606, the pedometer application can determine a pre-defined duration for the maintenance of historical step information. For example, the pedometer application can determine the pre-defined duration from a settings option (e.g., option 910 of FIG. 9). At step 1608, the pedometer application can upload a portion of historical step information that is older than the pre-defined duration to a server. For example, the pedometer application can upload a portion of historical step information to server 202 of FIG. 2.

Then, at step 1610, the pedometer application can determine whether an input to change the pre-defined duration has been received. For example, the user may select a settings option (e.g., option 910 of FIG. 9) to change the duration of the historical step information locally stored on the electronic device. If the pedometer application determines that an input to change the pre-defined duration has not been received, process 1600 may move to step 1612.

At step 1612, the pedometer application can determine whether the amount of memory available is below a pre-defined threshold. For example, the pre-defined threshold can be 30% of the total storage capacity available in memory (e.g., memory 104 of FIG. 1). If, at step 1612, the pedometer application determines that the amount of memory available is not below the pre-defined threshold, process 1600 may end at step 1614. Otherwise, process 1600 may move to step 1616.

At step 1616, if the pedometer application instead determines that the amount of memory available is below the pre-defined threshold, the pedometer application can decrease the pre-defined duration of historical step information locally stored on the electronic device. Process 1600 may then return to step 1608, where the pedometer application can upload historical step information that is older than the pre-defined duration to the server. As a result, more memory can be made available on the electronic device.

Referring back to step 1610, if the pedometer application instead determines that an input to change the pre-defined duration has been received, process 1600 may move to step 1618. At step 1618, the pedometer application can compare the changed duration to the pre-defined duration. After comparing the two durations, process 1600 may move to step 1620.

At step 1620, the pedometer application can determine whether the changed duration is shorter than the pre-defined duration. For example, the pedometer application can determine whether the user has selected a shorter duration using a settings option (e.g., option 910 of FIG. 9). If, at step 1620, the pedometer application determines that the changed duration is shorter than the pre-defined duration, process 1600 may move to step 1622.

At step 1622, the pedometer application can upload a portion of historical step information that is older than the changed duration to the server. Process 1600 may then return to step 1612, where the pedometer application can determine whether the amount of memory available is below the pre-defined threshold.

Referring back to step 1620, if the pedometer application instead determines that the changed duration is not shorter than the pre-defined duration, process 1600 may move to step 1624. At step 1624, the pedometer application can determine whether the changed duration is longer than the pre-defined duration. For example, the pedometer application can determine whether the user has selected a longer duration using a settings option (e.g., option 910 of FIG. 9). If, at step 1624, the pedometer application determines that the changed duration is not longer than the pre-defined duration (e.g., the changed duration is the same as the pre-defined duration), process 1600 may return to step 1612, as discussed previously.

If, at step 1624, the pedometer application instead determines that the changed duration is longer than the pre-defined duration, process 1600 may move to step 1626. At step 1626, the pedometer application can download missing historical step information (e.g., older historical step information falling between the changed duration and the pre-defined duration) from the server. After downloading the historical step information, process 1600 may return to step 1612, as discussed previously.

The described embodiments of the invention are presented for the purpose of illustration and not of limitation.

What is claimed is:

1. An electronic device for seamlessly switching between multiple exercise modes, the electronic device comprising:
   a sensor component that detects discrete elements of an exercise goal of a current user of the electronic device; and
   circuitry that:
      counts discrete elements of the exercise goal detected by the sensor component in a first exercise mode of the electronic device by incrementing a first counter but not a second counter for each discrete element of the exercise goal counted when the electronic device is in the first exercise mode;
      when the electronic device is in the first exercise mode, detects a first mode switch event to start a second exercise mode of the electronic device;
      switches to counting discrete elements of the exercise goal detected by the sensor component in the second exercise mode in response to detecting the first mode switch event by incrementing the second counter for each discrete element of the exercise goal counted when the electronic device is in the second exercise mode, wherein the second counter is separate from the first counter;
      when the electronic device is in the second exercise mode, detects a second mode switch event to end the second exercise mode; and switches back to counting discrete elements of the exercise goal detected by the sensor component in the first exercise mode in response to detecting the second mode switch event, wherein at least one of the following is true:
   the circuitry detects the first mode switch event by detecting a particular increase in the frequency of discrete elements of the exercise goal detected by the sensor component;
   the circuitry detects the first mode switch event by detecting a new current user of the electronic device;
   the circuitry detects the second mode switch event by determining that the electronic device is operating below a predefined power threshold; and
   the circuitry detects the second mode switch event when a period of time has elapsed since the second counter was last incremented.

2. The electronic device of claim 1, wherein the circuitry pauses the counting of discrete elements of the exercise goal in the first exercise mode when the circuitry switches to the counting of discrete elements of the exercise goal in the second exercise mode.

3. The electronic device of claim 1, wherein the circuitry stops the counting of discrete elements of the exercise goal in the second exercise mode when the circuitry switches back to the counting of discrete elements of the exercise goal in the first exercise mode.

4. The electronic device of claim 1, wherein the circuitry detects the second mode switch event by determining that the electronic device is operating below a predefined power threshold.

5. The electronic device of claim 1, wherein the first exercise mode is an ambient mode for counting discrete elements of the exercise goal within an ambient period, wherein the counting of discrete elements of the exercise goal in the first exercise mode automatically restarts at the end of the ambient period.

6. The electronic device of claim 1, wherein the second exercise mode is a session mode for counting discrete elements of the exercise goal for a particular session.

7. The electronic device of claim 1, wherein the circuitry detects the second mode switch event when a period of time has elapsed since the second counter was last incremented.

8. The electronic device of claim 1, wherein the circuitry detects the first mode switch event by detecting a particular increase in the frequency of discrete elements of the exercise goal detected by the sensor component.

9. The electronic device of claim 1, wherein the circuitry continues the counting of discrete elements of the exercise goal in the first exercise mode when switching to the counting of discrete elements of the exercise goal in the second exercise mode.

10. The electronic device of claim 5, wherein the ambient period is a pre-determined amount of time.

11. Non-transitory machine-readable media for switching between a first exercise mode of an electronic device and a second exercise mode of the electronic device, the non-transitory machine-readable media comprising machine-readable instructions recorded thereon for:
   counting discrete elements of an exercise goal when the electronic device is in the first exercise mode by incrementing a first counter but not a second counter for each discrete element counted in the first exercise mode;
   detecting a first mode switch event at the electronic device when the electronic device is in the first exercise mode;
   switching to counting discrete elements of the exercise goal in the second exercise mode of the electronic device in response to detecting the first mode switch event by incrementing the second counter for each discrete element counted in the second exercise mode, wherein the second counter is different than the first counter;
   detecting a second mode switch event at the electronic device when the electronic device is in the second exercise mode; and
   switching back to counting discrete elements of the exercise goal in the first exercise mode of the electronic device in response to detecting the second mode switch event, wherein at least one of the following is true:
      the detecting the first mode switch event comprises detecting at the electronic device a particular increase in the frequency of discrete elements of the exercise goal counted;
      the detecting the first mode switch event comprises detecting at the electronic device a new current user of the electronic device;
      the detecting the second mode switch event comprises determining at the electronic device that the electronic device is operating below a predefined power threshold; and
      the detecting the second mode switch event comprises detecting at the electronic device that a particular period of time has elapsed since the second counter was last incremented.

12. A method for seamlessly switching between a first exercise mode of an electronic device and a second exercise mode of the electronic device, the method comprising:
   counting discrete elements of an exercise goal using the electronic device in the first exercise mode, wherein the counting of discrete elements of the exercise goal in the first exercise mode comprises incrementing a first counter but not a second counter for each discrete element of the exercise goal counted in the first exercise mode;
   when in the first exercise mode, detecting a first mode switch event using the electronic device to start the second exercise mode;
   in response to detecting the first mode switch event, switching to counting discrete elements of the exercise goal using the electronic device in the second exercise mode, wherein the counting of discrete elements of the exercise goal in the second exercise mode comprises incrementing the second counter for each discrete element of the exercise goal counted in the second exercise mode, wherein the second counter is separate from the first counter;
   when in the second exercise mode, detecting a second mode switch event using the electronic device to end the second exercise mode; and
   in response to detecting the second mode switch event, switching back to counting discrete elements of the exercise goal using the electronic device in the first exercise mode, wherein at least one of the following is true:
      the detecting the first mode switch event comprises detecting using the electronic device a particular increase in the frequency of discrete elements of the exercise goal counted;
      the detecting the first mode switch event comprises detecting using the electronic device a new current user of the electronic device;

the detecting the second mode switch event comprises determining using the electronic device that the electronic device is operating below a predefined power threshold; and the detecting the second mode switch event comprises detecting using the electronic device that a particular period of time has elapsed since the second counter was last incremented.

13. The method of claim 12, wherein the switching to counting discrete elements of the exercise goal in the second exercise mode comprises continuing the counting of discrete elements of the exercise goal in the first exercise mode.

14. The method of claim 12, wherein the switching to counting discrete elements of the exercise goal in the second exercise mode comprises pausing the counting of discrete elements of the exercise goal in the first exercise mode.

15. The method of claim 12, further comprising resetting the first counter at the end of a pre-determined period of time.

16. The method of claim 12, wherein the detecting the first mode switch event comprises detecting using the electronic device a new current user of the electronic device.

17. The method of claim 14, wherein the switching back comprises:

pausing the counting of discrete elements of the exercise goal in the second exercise mode; and restarting the counting of discrete elements of the exercise goal in the first exercise mode.

18. The method of claim 15, further comprising, before the resetting, storing the value of the first counter at the end of the pre-determined amount of time.

19. The method of claim 15, further comprising, concurrently:

displaying a calendar indicative of a first time period;

highlighting a first region of the calendar indicative of a first duration of the first time period, wherein the first duration is equal to the pre-determined amount of time; and displaying information related to the value of the first counter at the end of the pre-determined amount of time.

20. The method of claim 17, wherein the switching back further comprises resetting the first counter before the restarting.

* * * * *